United States Patent
Ostoja Starzewski et al.

(10) Patent No.: US 7,169,866 B2
(45) Date of Patent: *Jan. 30, 2007

(54) PROCESS FOR PREPARING HOMOPOLYMERS, COPOLYMERS AND/OR BLOCK COPOLYMERS BY LIVING POLYMERIZATION WITH METALLOCENES HAVING A DONOR-ACCEPTOR INTERACTION

(75) Inventors: Karl-Heinz Aleksander Ostoja Starzewski, Rösrath (DE); Norbert Steinhauser, Monheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,980

(22) Filed: Sep. 22, 2003

(65) Prior Publication Data
US 2004/0063877 A1   Apr. 1, 2004

(30) Foreign Application Priority Data
Sep. 23, 2002 (DE) .............................. 102 44 213

(51) Int. Cl.
C08F 4/6392 (2006.01)
C08F 4/64 (2006.01)
C08F 10/00 (2006.01)

(52) U.S. Cl. ...................... 526/161; 526/160; 526/165; 526/131; 526/348; 526/943; 502/155

(58) Field of Classification Search ................ 526/160, 526/161, 165, 131, 348, 943
See application file for complete search history.

(56) References Cited

U.S. PATENT DOCUMENTS

| | | | |
|---|---|---|---|
| 4,695,557 A | 9/1987 | Suzuki et al. | |
| 5,391,629 A | 2/1995 | Turner et al. | 525/268 |
| 5,563,219 A | 10/1996 | Yasuda et al. | 525/269 |
| 5,698,634 A | 12/1997 | Yasuda et al. | 525/269 |
| 6,156,857 A | 12/2000 | Starzewski et al. | |
| 6,172,169 B1 | 1/2001 | Starzewski et al. | |
| 6,174,974 B1 | 1/2001 | Starzewski et al. | |
| 6,184,320 B1 | 2/2001 | Starzewski et al. | |
| 6,191,241 B1 | 2/2001 | Starzewski et al. | |
| 6,232,413 B1 | 5/2001 | Starzewski et al. | |
| 6,353,064 B1 | 3/2002 | Ostoja-Starzewski | |
| 6,423,659 B1 | 7/2002 | Starzewski et al. | |
| 6,787,617 B1 | 9/2004 | Soga et al. | 526/153 |
| 6,838,540 B2 | 1/2005 | Mitani et al. | 526/348 |
| 2003/0114623 A1 | 6/2003 | Mitani et al. | 526/352 |
| 2005/0065302 A1 | 3/2005 | Mitani et al. | 526/161 |

FOREIGN PATENT DOCUMENTS

| | | |
|---|---|---|
| GB | 2 307 238 | 5/1997 |
| WO | 02/076999 | 10/2002 |

OTHER PUBLICATIONS

J. Amer. Chem. Soc., 124, (month unavailable) 2002, pp. 3326-3336, Makoto Mitani et al, "Living Polymerization of Ethylene Catalyzed by Titanium Complexes Having Fluorine-Containing Phenoxy-lmine Chelate Ligands" (Also see Supporting Info attached).

Chem. Letters, (month unavailable) 2001, pp. 576-577, Junji Saito et al, "Highly Syndiospecific Living Polymerization of Propylene Using a Titanium Complex Having Two Phenoxy-lmine Chelate Ligands".

Angew. Chemie, 41, (month unavailable) 2002, pp. 2237-2257, Geoffrey W. Coates, et al, "Catalysts for the Living Insertion Polymerization of Alkenes: Access to New Polyolefin Architectures Using Ziegler-Natta Chemistry" (translation for Angew. Chem. 114, 2002).

J. Amer. Chem. Soc., 124, (month unavailable) 2002, pp. 3327-3336, Makoto Mitani et al., "Living Polymerization of Ethylene Catalyzed by Titanium Complexes Having Fluorine-Containing Phenoxy-Imine Chelate Ligands" (Also see Supporting Info attached.).

Chem. Letters, (month unavailable) 2001, pp. 576-577, Junji Saito et al, "Highly Syndiospecific Living Polymerization of Propylene Using a Titanium Complex Having Two Phenoxoy-lmine Chelate Ligands".

Angew. Chemie, 41, (month unavailable) 2002, pp. 2236-2257, Geoffrey W. Coates, et al. "Catalysts for the Living Insertion Polymerization of Alkenes: Access to New Polyolefin Architectures Using Ziegler-Natta Chemistry" (translation for Angew. Chem. 114, 2002).

*Primary Examiner*—Caixia Lu
(74) *Attorney, Agent, or Firm*—Jennifer R. Sang

(57) ABSTRACT

The present invention relates to a process for preparing homopolymers, copolymers and/or block copolymers of 1-olefins by living polymerization, to the use of the homopolymers, copolymers and/or block copolymers obtained for producing high-value materials and to the polymers formed from these homopolymers and/or block copolymers.

7 Claims, 3 Drawing Sheets

PROCESS FOR PREPARING HOMOPOLYMERS, COPOLYMERS AND/OR BLOCK COPOLYMERS BY LIVING POLYMERIZATION WITH METALLOCENES HAVING A DONOR-ACCEPTOR INTERACTION

FIELD OF THE INVENTION

The present invention relates to a process for preparing homopolymers and/or block copolymers of 1-olefins by living polymerization, to the high-value materials produced with the homopolymers and/or block copolymers obtained and to the polymers formed from these homopolymers and/or block copolymers.

BACKGROUND OF THE INVENTION

There is a need for polymers of 1-olefins which are prepared by living polymerization, since living polymerization is a valuable method of preparing tailored polymers which are not obtainable by other conventional methods.

In EP-A 206 753, Y. Doi et al. discloses the process of living polymerization using a vanadium Ziegler/Natta catalyst at −78° C.

EP-A 1 209 171, EP-A 634 429, U.S. Pat. No. 5,391,629, WO 01/55231 and also J. Amer. Chem. Soc. 2002, 124, 3327-3336, Chem. Letters 2001, 576 and Angew. Chem 2002, 114, 2361, disclose processes which make it possible to increase the polymerization temperature by use of particular catalysts.

WO 98/01455 and WO 98/45339 describe processes for preparing homopolymers and copolymers by means of transition metal compounds which have a donor-acceptor interaction. However, these processes are carried out using catalysts and at temperatures which prevent a living polymerization. In the process described in the prior art, the length of the polymer chains is not easy to control. The formation of sequence-like block copolymers such as isotactic polypropylene (iPP), atactic polypropylene (aPP) or ethylene-propylene-propene-ethylene copolymers (EPM-EP) have also been reported. However, their are no known simple ways of regulating or controlling the block length of these block copolymers, which possibly result from switching between bridged and unbridged donor-acceptor structures, and there is no known way of preparing 2- or 3-block copolymers in a targeted manner.

A disadvantage of the processes described in the prior art is the use of catalysts which require industrially unattractive reaction conditions. One of the main problems is the need for very low polymerization temperatures of from −70° to −50° C. As a result, the polymerization is too slow and the process becomes uneconomical. The degrees of polymerization and thus the final molar masses achieved are unsatisfactory in these processes.

It is therefore an object of the present invention to provide a process for preparing homopolymers, copolymers and/or block copolymers which makes the living polymerization of 1-olefins possible, and which can be used at elevated temperatures and leads to high molar masses in short polymerization times.

SUMMARY OF THE INVENTION

The present invention provides a process for preparing homopolymers, copolymers and/or block copolymers of one or more 1-olefins, wherein a) transition metal compounds having a fluorenyl ligand, at least one further ligand and at least one donor-acceptor interaction between the ligands or reaction products of these transition metal compounds and cocatalysts are used,
b) the polymerization is carried out in the temperature range from −40° to +15° C. and
c) to form block copolymers, the monomers are added in succession.

DETAILED DESCRIPTION OF THE INVENTION

Figure 1:
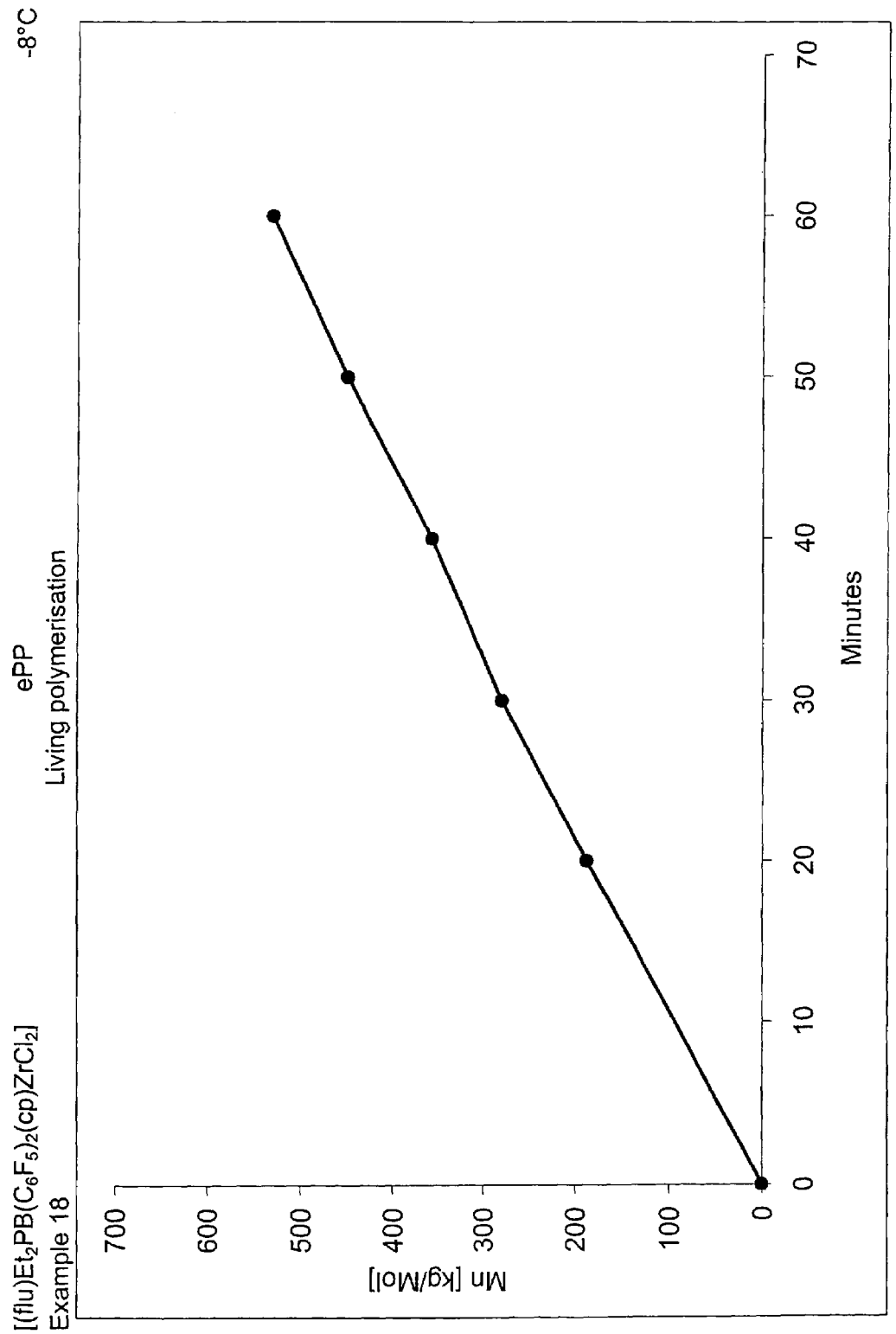
FIG. 1 graphically illustrates a lining polymerization in accordance with Example 18, wherein said graphical illustration plots Molecular Weight, Mn, (Kg/Mol) versus Time (Minutes).

In the process of the invention, it is preferred to use transition metal compounds in which the second ligand is a cyclopentadienyl ligand.

Block copolymers are preferably built up from one or more polar or nonpolar monomers in the process of the present invention.

The process of the present invention is preferably used to prepare homopolymers and/or copolymers having a polydispersity $M_w/M_n$ in the range from 1 to 2.

2-block copolymers are preferably prepared by the process of the present invention.

The process of the present invention also allows 3-block copolymers and multiblock copolymers to be prepared.

Addition of termination reagents enables end-functionalized homopolymers, copolymers and/or block copolymers to be prepared by the process of the present invention.

The present invention further provides a process for preparing polymers having bimodal molar mass distributions by using a further transition metal compound with or without a donor-acceptor interaction, with the difference between the two molar masses being able to be varied via the time for which polymerization is carried out in the temperature range of the process of the present invention.

The homopolymers and/or block copolymers obtained by the process of the present invention are preferably used for compounding of polymers.

The block copolymers from the process of the present invention are preferably used for producing elasticized, high-impact thermoplastics.

The block copolymers from the process of the present invention are also preferably used for producing rubbers having a high green strength.

The homopolymers, copolymers and/or block copolymers from the process of the present invention are also preferably used for producing thermoplastic elastomers (TPEs) having a melting point greater than +60° C. and a glass transition temperature of less than +10° C.

The present invention further provides the homopolymers, random or alternating copolymers and also sequenced copolymers obtainable from the process of the present invention.

In addition, the present invention provides the block copolymers obtainable from the process of the present invention.

The present invention further provides the end-functionalized homopolymers, copolymers and block copolymers obtainable from the process of the present invention.

The present invention further provides the polymers produced using the homopolymers, copolymers and/or block copolymers from the process of the present invention.

Suitable transition metal compounds having at least one donor-acceptor interaction include the transition metal compounds having a donor-acceptor interaction described in the patent applications WO-A-98/01455, WO-A-98/45339, WO-A-98/01483, WO-A-98/01484, WO-A-98/01485, WO-A-98/01486 and WO-A-98/01487, characterized in that these transition metal compounds have a fluorenyl ligand.

Suitable transition metal compounds are compounds of the formulae

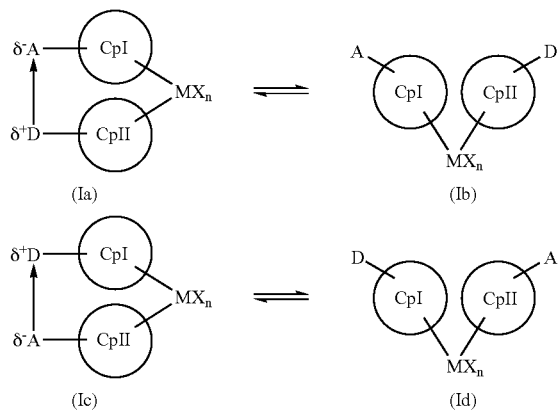

in which one of the Cp ligands

CpI or CpII is a fluorenyl or substituted fluorenyl ligand and the other ligand is the same carbanion or a different carbanion having a cyclopentadienyl-containing structure, where both in the fluorenyl ligand and also in the other ligand from one to all H atoms may be replaced by identical or different radicals selected from the group consisting of linear and branched $C_1$–$C_{20}$-alkyl which may be monohalogenated to perhalogenated, phenyl, vinyl, $C_6$–$C_{12}$-aryl, haloaryl having from 6 to 12 carbon atoms and organometallic substituents such as silyl, trimethylsilyl or ferrocenyl and by 1 or 2 D and A, D is a donor atom which may additionally bear substituents and which in its respective bonding state has at least one free electron pair, A is an acceptor atom which may additionally bear substituents and which in its respective bonding state has an electron pair gap, where D and A are linked by means of a reversible coordinate bond in such a way that the donor group acquires a positive (partial) charge and the acceptor group acquires a negative (partial) charge, M is a metal of groups 3–7 of the Periodic Table of the Elements in the IUPAC (1985) version, including the lanthanides and actinides, X is an anion equivalent and n is zero, one, two, three or four depending on the charge on M.

One of the CpI and CpII ligands has to be a fluorenyl or substituted fluorenyl anion. The other ligand preferably has a cyclopentadienyl-containing skeleton, with ligands selected from the group consisting of cyclopentadiene, substituted cyclopentadiene, indene, substituted indene, fluorene and substituted fluorene being preferred. More preference is given to cyclopentadienyl and substituted cyclopentadienyl anions as other ligands.

The number of substituents on CpI and CpII is from 1 to 4 substituents per cyclo-pentadiene ring or fused-on benzene ring. These substituents can be $C_1$–$C_{20}$-alkyl such as methyl, ethyl, propyl, isopropyl, butyl or isobutyl, hexyl, octyl, decyl, dodecyl, hexadecyl, octadecyl, eicosyl, $C_1$–$C_{20}$-alkoxy such as methoxy, ethoxy, propoxy, isopropoxy, butoxy or isobutoxy, hexoxy, octyloxy, decyloxy, dodecyloxy, hexadecyloxy, octadecyloxy, eicosyloxy, halogen such as fluorine, chlorine or bromine, $C_6$–$C_{12}$-aryl such as phenyl, $C_1$–$C_4$-alkylphenyl such as tolyl, ethylphenyl, (i-)propylphenyl, (i-)butylphenyl, tert-butylphenyl, xylyl, halophenyl such as fluorophenyl, chlorophenyl, bromophenyl, difluorophenyl, trifluorophenyl, tetrafluorophenyl, pentafluorophenyl, pentachlorophenyl, naphthyl or biphenylyl, triorganosilyl such as trimethylsilyl (TMS), triorganostannyl, ferrocenyl and D or A, as defined above. Two of these substituents can in turn be linked so as to form a ring, e.g. as a propane-1,3-diyl unit to form a 5-membered ring or as a butane-1,4-diyl unit to form a 6-membered ring. Furthermore, fused-on aromatic rings can be partially or fully hydrogenated so that only the double bond which forms part of both the fused-on ring and the cyclopentadiene ring remains. Benzene rings as in indene or fluorene may also have one or two further fused-on benzene rings. In addition, the cyclopentadiene or cyclopentadienyl ring and the fused-on benzene ring can share a further benzene ring which is fused onto both systems. Such cyclopentadiene skeletons are in the form of their anions excellent ligands for transition metals, with each cyclopentadienyl carbanion in the abovementioned, substituted or unsubstituted form balancing one positive charge of the central metal in the complex.

Suitable examples of such carbanions include: cyclopentadienyl, methylcyclopentadienyl, 1,2-dimethylcyclopentadienyl, 1,3-dimethylcyclopentadienyl, indenyl, 2-methylindenyl, 4,7-dimethylindenyl, 2,4,7-trimethylindenyl, phenylindenyl, 1,2-diethylcyclopentadienyl, tetramethylcyclopentadienyl, ethylcyclopentadienyl, n-butylcyclopentadienyl, n-octylcyclopentadienyl, β-phenylpropylcyclopentadienyl, tetrahydroindenyl, propylcyclopentadienyl, t-butylcyclopentadienyl, benzylcyclopentadienyl, diphenylmethylcyclopentadienyl, trimethylgermylcyclopentadienyl, trimethylstannylcyclopentadienyl, trifluoromethylcyclopentadienyl, trimethylsilylcyclopentadienyl, pentamethylcyclopentadienyl, fluorenyl, tetrahydrofluorenyl or octahydrofluorenyl, fluorenyls and indenyls which are benzo-fused on the six-membered ring, N,N-dimethylaminocyclopentadienyl, dimethylphosphinocyclopentadienyl, methoxycyclopentadienyl, trimethylsiloxycyclopentadienyl, dimethylboranylcyclopentadienyl, (N,N-dimethylaminomethyl)cyclopentadienyl.

Depending on the charge on M, the index n takes on the value zero, one, two, three or four, preferably zero, one or two, since the abovementioned metals of groups 3–7 can, depending, inter alia, on the subgroups to which they belong, have valencies/charges of from two to six, preferably from two to four, of which two are in each case balanced by the carbanions of the metallocene compound. Accordingly, the index n is one in the case of $La^{3+}$ and is two in the case of $Zr^{4+}$; in the case of $Sm^{2+}$, n=zero.

As regards the preparation of the compounds (I), reference may be made to WO-A-98/01455.

Further suitable metallocene compounds are compounds of the formula (II)

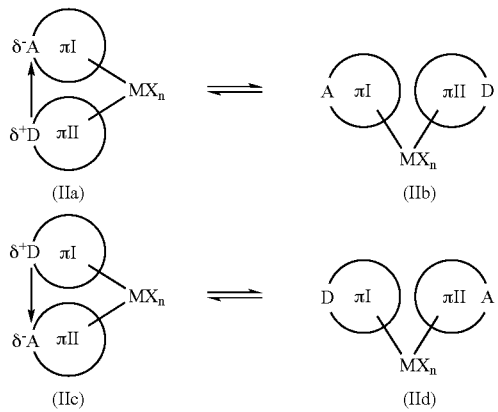

(IIa) (IIb)

(IIc) (IId)

in which one of the π systems

πI and πII is a fluorenyl or substituted fluorenyl ligand and the other is the same π system or a different charged or electrically neutral group π system, with both ligands being able to be fused with one or two unsaturated or saturated five- or six-membered rings, D is a donor atom which is a substituent on πI/πII or part of the π system of πI/πII and which in its respective bonding state has at least one free electron pair, A is an acceptor atom which is a substituent of πI/πII or part of the π system of πI/πII and which in its respective bonding state has an electron pair gap, where D and A are linked by means of a reversible coordinate bond in such a way that the donor group bears a positive (partial) charge and the acceptor group bears a negative (partial) charge and at least one of D and A is part of the respective associated π system, where D and A may in turn bear substituents, where each π system or each fused-on ring system may contain one or more D or A and where, in πI and πII in the unfused or fused form, one or all H atoms of the π system may, independently of one another, be replaced by identical or different substituents selected from the group consisting of linear or branched $C_1$–$C_{20}$-alkyl which may be monohalogenated to perhalogenated, phenyl, vinyl, $C_6$–$C_{12}$-aryl, haloaryl having from 6 to 12 carbon atoms and by one or two D and A, so that the reversible coordinate D→A bond is formed (i) between D and A which are both parts of the respective π system or the fused-on ring system, or (ii) of which D or A is part of the π system or the fused-on ring system and the other is a substituent on the unfused π system or the fused-on ring system or (iii) both D and A are substituents of this type, where in the case of (iii) at least one additional D or A or both is/are parts of the π system or the fused-on ring system, M is a metal of groups 3–7 of the Periodic Table of the Elements in the IUPAC (1985) version, including the lanthanides and actinides, X is an anion equivalent and n is zero, one, two, three or four, depending on the charges on M and on πI and πII.

According to the present invention, one π system is a substituted or unsubstituted fluorenyl while the other can be a substituted or unsubstituted ethylene, allyl, pentadienyl, benzyl, butadiene, benzene, a cyclopentadienyl anion or a species obtained by replacement of at least one carbon atom by a heteroatom. Among the species mentioned, the cyclic species are preferred. More preference is given to the cyclopentadienyl anion and a substituted cyclopentadienyl anion as π system other than fluorenyl. The coordination of such ligands (π systems) to the metal can be of the σ type or of the π type.

Preference is given to sandwich structures in which the other ligand is selected from the group consisting of the π systems cyclopentadienyl (cp), indenyl (ind) and fluorenyl (flu).

cp-flu ind-flu flu-flu

More preference is given to the combination cp-flu. In a preferred embodiment, one carbon atom of the fluorenyl ligand is replaced by a donor heteroatom so that D is part of a π system (flu) and A is a substituent of the other π system. Examples of such heterofluorenyl ligands include the azafluorenyl anion (carbazolyl)

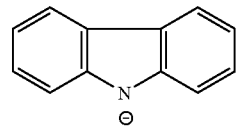

or the phosphafluorenyl anion (dibenzophospholyl)

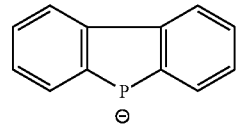

Depending on the charge on M, the index n takes on the value zero, one, two, three or four, preferably zero, one or two, since the abovementioned transition metals of groups 3–7 can, depending, inter alia, on the subgroups to which they belong, have valencies/charges of from two to six, preferably from two to four, of which two are in each case balanced by the carbanions of the metallocene compound. Accordingly, the index n is one in the case of $La^{3+}$ and is two in the case of $Zr^{4+}$; in the case of $Sm^{2+}$, n=zero. Preference is given to compounds of the formula (I).

In the formation of the metallocene structure as in the above formula (I) or (II), one positive charge of the transition metal M is balanced by one cyclopentadienyl-containing carbanion. Remaining positive charges on the central atom M are balanced by further, usually monovalent, anions X of which two identical or different anions may also be linked to one another

for example monovalent or divalent negative radicals derived from identical or different, linear or branched, saturated or unsaturated hydrocarbons, amines, phosphines, thioalcohols, alcohols or phenols. Simple anions such as $CR_3^-$, $NR_2^-$, $PR_2^-$, $OR^-$, $SR^-$, etc., can be linked by saturated or unsaturated hydrocarbon or silane bridges to form dianions in which the number of bridging atoms can be 0, 1, 2, 3, 4, 5 or 6. Preference is given to from 0 to 4 bridging atoms, more preferably 1 or 2 bridging atoms. The bridging atoms may bear not only H atoms but also further hydrocarbon substituents R. Examples of bridges between simple anions include —$CH_2$—, —$CH_2$—$CH_2$—, —$(CH_2)_3$—, —CH=CH—, —(CH=CH)$_2$—, —CH=CH—ch$_2$—, —$CH_2$—CH=CH—$CH_2$—Si$(CH_3)_2$—, —$C(CH_3)_2$—. Examples of X include: hydride, chloride, methyl, ethyl, phenyl, fluoride, bromide, iodide, the n-propyl radical, the i-propyl radical, the n-butyl radical, the amyl radical, the i-amyl radical, the hexyl radical, the i-butyl radical, the heptyl radical, the octyl radical, the nonyl radical, the decyl radical, the cetyl radical, methoxy, ethoxy, propoxy, butoxy, phenoxy, dimethylamino, diethylamino, methylethylamino, di-t-butylamino, diphenylamino, diphenylphosphino, dicyclohexylphosphino, dimethylphosphino, methylidene, ethylidene, propylidene and the ethylene glycol dianion. Examples of dianions are 1,4-diphenyl-1,3-butadienediyl, 3-methyl-1,3-pentadienediyl, 1,4-dibenzyl-1,3-butadienediyl, 2,4-hexadienediyl, 1,3-pentadienediyl, 1,4-ditolyl-1,3-butadienediyl, 1,4-bis(trimethylsilyl)-1,3-butadienediyl, 1,3-butadienediyl. Particular preference is given to 1,4-diphenyl-1,3-butadienediyl, 1,3-pentadienediyl, 1,4-dibenzyl-1,3-butadienediyl, 2,4-hexadienediyl, 3-methyl-1,3-pentadienediyl, 1,4-ditolyl-1,3-butadienediyl and 1,4-bis(trimethylsilyl)-1,3-butadienediyl. Further examples of dianions are ones containing heteroatoms, for instance of the structure

where the bridge has the meanings given above. In addition, weakly coordinating or noncoordinating anions or singly negatively charged anions of the type CpI, CpII, πI, πII with the above-described possible substituents which may bear additional D or A substituents are preferred for balancing the charge.

The compounds of the formula (II) can be prepared as described in WO-A-98/45339.

Apart from the obligatory first donor-acceptor bond between D and A in the formulae (I) and (II), further donor-acceptor bonds may be formed when additional atoms D and/or A are present as substituents in the respective cyclopentadiene systems. All donor-acceptor bonds are characterized by their above-described reversibility. In the case of a plurality of atoms D and/or A, these can occupy various positions among those mentioned. Accordingly, the invention encompasses both the bridged molecular states and the unbridged states. The number of groups D can be equal to or different from the number of groups A. Preference is given to the ligands, CpI and CpII, being linked via only one donor-acceptor bridge.

Apart from the D/A bridges according to the present invention, covalent bridges can also be present in the formulae (I) and (II). In this case, the D/A bridges increase the stereorigidity and the thermal stability of the catalyst. Changing between closed and open D/A bonds makes it possible to obtain sequence polymers having a higher and lower stereoregularity. In the case of copolymers, such sequences can have different chemical compositions.

Suitable donor groups in the formulae (I) and (II) are, preferably, ones in which the donor atom D is an element of group 15, 16 or 17 of the Periodic Table of the Elements and has at least one free electron pair and in the case of the donor atom being an element of group 15 it may be bound to substituents and in the case of the donor atom being an element of group 16 it may be bound to a substituent; donor atoms of group 17 do not bear any substituents. For example, phosphorus P, oxygen O and chlorine Cl as donor atoms, where "Subst." represents such a substituent and "—Cp" represents the bond to the cyclopentadienyl-containing carbanion, a stroke with an arrow represents a coordinate bond in the formula (I) or (II) and other strokes represent electron pairs:

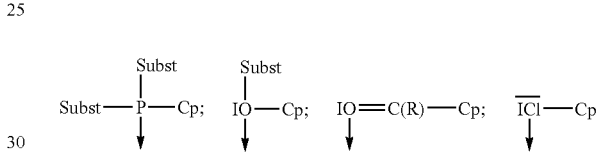

Suitable acceptor groups in the formulae (I) and (II) are, preferably, ones whose acceptor atom A is an element of group 13 of the Periodic Table of the Elements (IUPAC 1985 version), e.g. boron, aluminium, gallium, indium or thallium, and is bound to substituents and has an electron gap.

D and A are linked via a coordinate bond, also referred to as a dative bond, with D acquiring a positive (partial) charge and A acquiring a negative (partial) charge.

A distinction is accordingly made between the donor atom D and the donor group and between the acceptor atom A and the acceptor group. The coordinate bond D→A is established between the donor atom D and the acceptor atom A. The donor group is the unit made up of the donor atom D, any substituents present and the electron pairs present; correspondingly, the acceptor group is the unit made up of the acceptor atom A, the substituents and the electron gaps present.

Donor groups are ones in which the free electron pair is localized on N, P, As, Sb, Bi, O, S, Se, Te, F, Cl, Br, I; among these, preference is given to N, P, O, S. Examples of donor groups include: $(CH_3)_2N$—, $(C_2H_5)_2N$—, $(C_3H_7)_2N$—, $(C_4H_9)_2N$—, $(C_6H_5)_2N$—, $(CH_3)_2P$—, $(C_2H_5)_2P$—, $(C_3H_7)_2P$—, $(i-C_3H_7)_2P$—, $(C_4H_9)_2P$—, $(t-C_4H_9)P$—, (cyclohexyl)$_2P$—, $(C_6H_5)_2P$—, $(CH_3)(C_6H_5)P$—, $(CH_3O)_2P$—, $(C_2H_5O)_2P$—, $(C_6H_5O)_2P$—, $(CH_3$—$C_6H_4O)_2P$—, $((CH_3)_2N)_2P$—, methyl-containing phosphino groups, $CH_3O$—, $CH_3S$—, $C_6H_5S$—, —$C(C_6H_5)$=O, —$C(CH_3)$=O, —$OSi(CH_3)_3$, —$OSi(CH_3)_2$-t-butyl, in which N and P each bear a free electron pair and O and S bear two free electron pairs and double-bonded oxygen is bound via a spacer group, and also systems such as the pyrrolidone ring in which ring atoms other than N likewise act as spacers.

Acceptor groups are ones in which an electron pair gap is present on B, Al, Ga, In or Tl, preferably B, Al or Ga; examples include: $(C_6H_5)_2B$—, $H_2B$—, (vinyl)$_2B$—, (benzyl)$_2$B, (C$_6$H$_5$)(alkyl)B—, (C$_6$H$_5$)HB—, (CH$_3$)(C$_6$H$_5$)B—, (vinyl)(C$_6$H$_5$)B—, (benzyl)(C$_6$H$_5$)B—, Cl(C$_6$H$_5$)B—, (CH$_3$O)(C$_6$H$_5$)B—, Cl$_2$B—, (CH$_2$O)$_2$B—, Cl$_2$Al—, Cl(C$_6$H$_5$)Al—, (alkyl)(C$_6$H$_5$)Al—, (C$_6$H$_5$)(C$_6$H$_5$)Al—, (C$_6$H$_5$)$_2$Al—, (C$_6$H$_5$)Ga—, (C$_6$H$_5$)(alkyl)Ga—, (CH$_3$)$_2$Ga—, (C$_3$H$_7$)$_2$Ga—, (CH$_3$)$_3$Si—CH$_2$)$_2$Ga, (vinyl)$_2$Ga, (CH—$_3$)$_2$B—, (C$_2$H$_5$)Al—, (i-C$_3$H$_7$)$_2$Al—, (C$_4$H$_9$)$_2$Al—, (i-C$_4$H$_9$)$_2$Al—, (Cl)(C$_2$H$_5$)Al—, (CH$_3$)$_2$In—, (CH$_3$)$_3$SC—CH$_2$)$_2$In—, (cyclopentadienyl)$_2$In—.

Examples of substituents on the donor atoms N, P, As, Sb, Bi, O, S, Se and Te and on the acceptor atoms B, Al, Ga, In and Tl include: $C_1$–$C_{12}$-(cyclo)alkyl such as methyl, ethyl, propyl, i-propyl, cyclopropyl, butyl, i-butyl, tert-butyl, cyclobutyl, pentyl, neopentyl, cyclopentyl, hexyl, cyclohexyl, the isomeric heptyls, octyls, nonyls, decyls, undecyls, dodecyls; the corresponding $C_1$–$C_{12}$-alkoxy groups; vinyl, butenyl, allyl; $C_6$–$C_{12}$-aryl such as phenyl, naphthyl or biphenylyl, benzyl, which may bear halogens, 1 or 2 $C_1$–$C_4$-alkyl groups, $C_1$–$C_4$-alkoxy groups, sulphonate or nitro or haloalkyl groups, $C_1$–$C_6$-alkylcarboxy, $C_1$–$C_6$-alkylcarbonyl or cyano as substituents (e.g. perfluorophenyl, m,m'-bis(trifluoromethyl)phenyl, tri($C_1$–$C_{20}$-alkyl)silyl, tri($C_6$–$C_{12}$-aryl)silyl and analogous constituents with which those skilled in the art are familiar); analogous aryloxy groups; indenyl; halogen such as Fe, Cl, Br and I, 1-thienyl, disubstituted amino such as ($C_1$–$C_{12}$-alkyl)$_2$amino, diphenylamino, tris($C_1$–$C_{12}$-alkyl)silyl, NaSO$_3$-aryl such as NaSO$_3$-phenyl and NaSO$_3$-tolyl, C$_6$H$_5$—C≡C—; aliphatic and aromatic $C_1$–$C_{20}$-silyl whose alkyl substituents may be, apart from those mentioned above, octyl, decyl, dodecyl, stearyl or eicosyl and whose aryl substituents may be phenyl, tolyl, xylyl, naphthyl or biphenylyl; and substituted silyl groups which are bound to the donor atom or acceptor atom via —CH$_2$—, for example (CH$_3$)$_3$SiCH$_2$—, ($C_1$–$C_{12}$-alkyl)(phenyl)amino, ($C_1$–$C_{12}$-alkylnaphthyl)amino, ($C_1$–$C_{12}$-alkylphenyl)$_2$amino, $C_6$–$C_{12}$-aryloxy containing the abovementioned aryl groups, $C_1$–$C_8$-perfluoroalkyl, perfluorophenyl. Preferred substituents include: $C_1$–$C_6$-alkyl, $C_5$–$C_6$-cycloalkyl, phenyl, tolyl, $C_1$–$C_6$-alkoxy, $C_6$–$C_{12}$-aryloxy, vinyl, allyl, benzyl, perfluorophenyl, F, Cl, Br, di($C_1$–$C_6$-alkyl)amino, diphenylamino.

Further suitable donor and acceptor groups are groups of this type which contain chiral centers or in which two substituents together with the D or A atom form a ring.

The process of the present invention for preparing homopolymers, copolymers or block copolymers of one or more 1-olefins can be carried out in the gas, solution, bulk, high-pressure or slurry phase at from −40 to +15° C., preferably in the range from −20 to +15° C., and from 0.5 to 5000 bar, preferably from 1 to 3000 bar, and in the presence or absence of saturated or aromatic hydrocarbons or of saturated or aromatic halogenated hydrocarbons. The present invention further provides a process for preparing polymers having a bimodal molar mass distribution. For this purpose, a further transition metal compound with or without a donor-acceptor interaction is introduced into the process using the transition metal compounds according to the present invention. The two transition metal compounds present in the reaction mixture result in formation of two polymers having different molar masses. A particular molar mass ratio of the two polymers can be set in a targeted manner in the resulting polymer by choice of the respective transition metal compounds. The amount of the transition metal compounds according to the present invention used is 1 mol per $10^1$ to $10^{12}$ mol of all monomers used, and the polymerization can be carried out in the further presence of cocatalysts such as Lewis acids, Bronsted acids or Pearson acids or in the additional presence of Lewis bases.

Examples of such Lewis acids include boranes or alanes, e.g. aluminium alkyls, aluminum halides, aluminum alkoxides, aluminoxanes, organoboron compounds, boron halides, boric esters, boroxanes or boron or aluminum compounds which contain both halide and alkyl or aryl or alkoxide substituents, and also mixtures thereof or the triphenylmethyl cation. Aluminoxanes or mixtures of aluminum-containing Lewis acids with water are preferred. On the basis of present-day knowledge, all acids act as ionizing agents which form a metallocenium cation whose charge is balanced by a bulky, weakly coordinating anion.

In the process of the present invention, the reaction products of such ionizing agents with the transition metal compounds of the formula (I) or (II) can also be used for preparing the homopolymers and/or block copolymers. They can be described by the formula (III) or (IV)

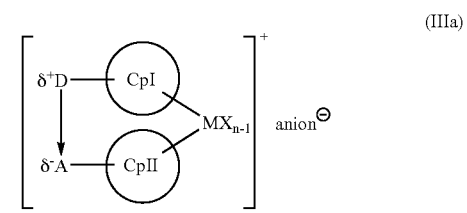

(IIIa)

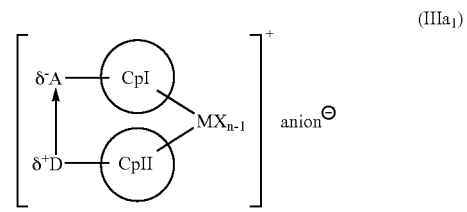

(IIIa$_1$)

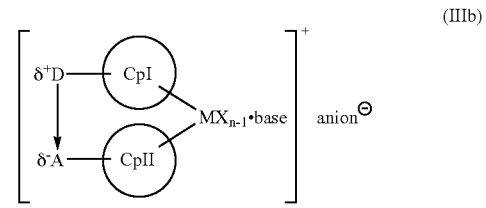

(IIIb)

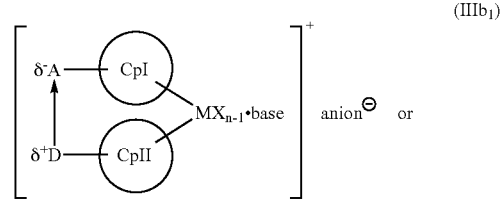

(IIIb$_1$)

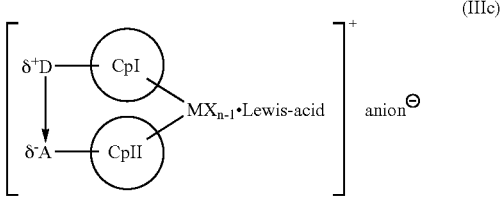

(IIIc)

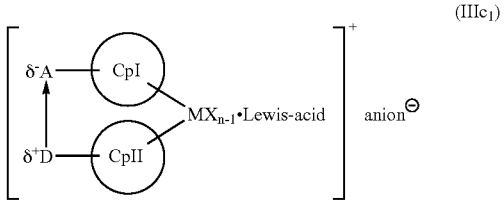

(IIIc$_1$)

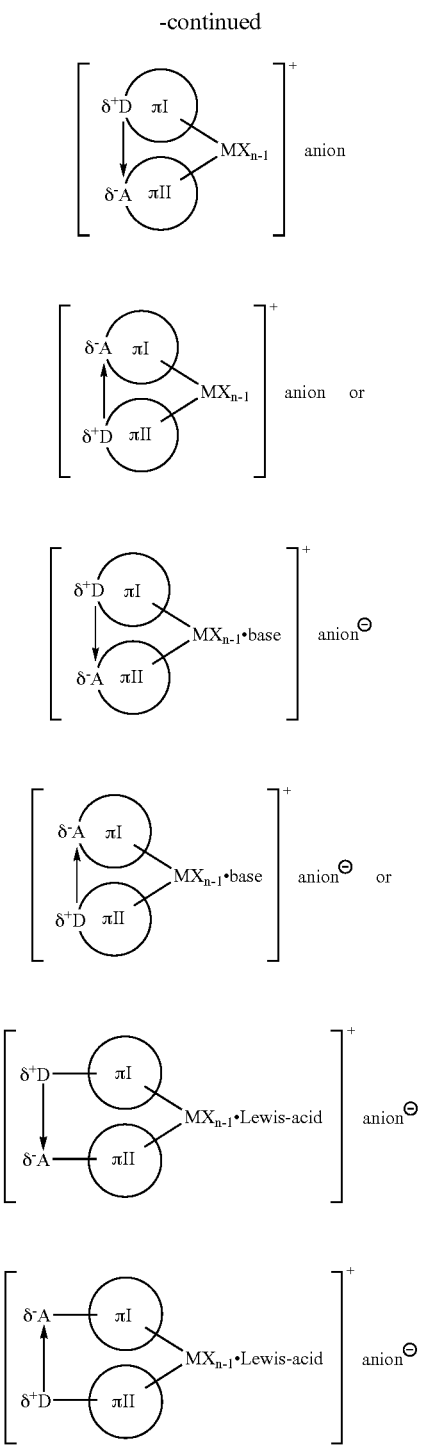

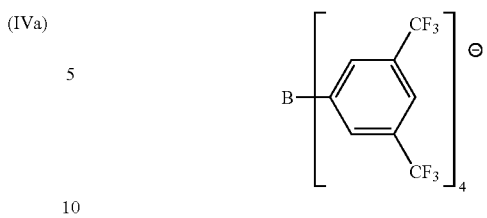

where
anion is the total bulky, weakly coordinating anion and base is a Lewis base.

The transition metal compounds of the formula (I), (II), (III) or (IV) used according to the present invention can be present in either monomeric, dimeric or oligomeric form.

Examples of such weakly coordinating anions include $B(C_6H_5)_4^{\ominus}$, $B(C_6F_5)_4^{\ominus}$, $B(CH_3)(C_6F_5)_3^{\ominus}$, or sulphonates such as tosylate or triflate, tetrafluoroborates, hexafluorophosphates or hexafluoroantimonates, perchlorates and also bulky cluster molecule anions of the carborane type, for example $C_2B_9H_{12}^{\ominus}$ or $CB_{11}H_{12}^{\ominus}$, and substituted or unsubstituted cyclopentadienyl, indenyl and fluorenyl anions. Possible substituents are those which have been described for CpI and CpII. When such anions are present, π complexes can act as highly effective polymerization catalysts even in the absence of aluminoxane. This is particularly the case when an X ligand is an alkyl or benzyl group. However, it can also be advantageous to use such π complexes having bulky anions in combination with aluminum alkyls such as $(CH_3)_3Al$, $(C_2H_5)_3Al$, $(n-/i-propyl)_3Al$, $(n-/t-butyl)_3Al$, $(i-butyl)_3Al$, the isomeric pentyl, hexyl or octyl aluminium alkyls, or lithium alkyls such as methyl-Li, benzyl-Li, butyl-Li or the corresponding organomagnesium compounds such as Grignard compounds or organotin compounds. Such metal alkyls transfer alkyl groups to the central metal and also scavenge water or catalyst poisons from the reaction medium or monomers in polymerization reactions. Examples of aluminum or boron compounds from which such anions can be derived include:

triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,5-trimethylanilinium) tetrakis(pentafluorophenyl)borate,
trimethylammonium tetrakis(2,3,4,6-tetrafluorophenyl)borate,
triethylammonium tetrakis(2,3,4,6-tetrafluorophenyl)borate,
tripropylammonium tetrakis(2,3,4,6-tetrafluorophenyl)borate,
tri(n-butyl)ammonium tetrakis(2,3,4,6-tetrafluorophenyl)borate,
dimethyl(t-butyl)ammonium tetrakis(2,3,4,6-tetrafluorophenyl)borate,
N,N-dimethylanilinium tetrakis(2,3,4,6-tetrafluorophenyl)borate,
N,N-diethylanilinium tetrakis(2,3,4,6-tetrafluorophenyl)borate,
N,N-dimethyl(2,4,6-trimethylanilinium) tetrakis(2,3,4,6-tetrafluorophenyl)borate;

dialkylammonium salts such as:
di(i-propyl)ammonium tetrakis(pentafluorophenyl)borate and
dicyclohexylammonium tetrakis(pentafluorophenyl)borate;
trisubstituted phosphonium salts such as:
triphenylphosphonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
tritolylmethyl tetrakis(pentafluorophenyl)borate,
triphenylmethyl tetraphenylborate (trityl tetraphenylborate),
trityl tetrakis(pentafluorophenyl)borate,
silver tetrafluoroborate,
tris(pentafluorophenyl)borane,
tris(trifluoromethyl)borane and also the analogous aluminum compouds.

The transition metal compounds or metallocene compounds used according to the present invention can be employed as pure materials in isolated form for the (co)polymerization. However, it is also possible for them to be generated and used "in situ" in the (co)polymerization reactor in a manner known to those skilled in the art.

Further cocatalysts are, for example, aluminoxane compounds. These are, for the purposes of the present invention, compounds of the formula (V)

(V)

where
R is $C_1$–$C_{20}$-alkyl, $C_6$–$C_{12}$-aryl or benzyl and
n is an integer from 1 to 50, preferably from 10 to 35.

It is likewise possible to use a mixture of various aluminoxanes or a mixture of their precursors (aluminum alkyls or alkylaluminum halides) in combination with water (in gaseous, liquid, solid or bound form, for instance as water of crystallization). The water can also be introduced as (residual) moisture in the polymerization medium, the monomer or a support such as silica gel or aluminosilicate.

The bonds projecting from the square bracket of formula (V) bear R groups or $AlR_2$ groups or HO groups as the ends of the oligomeric aluminoxane. Such aluminoxanes are generally in the form of a mixture of a plurality of such molecules having different chain lengths. Close examination has also revealed aluminoxanes having cyclic or cage-like structures. Aluminoxanes are commercial products. In the specific case of $R=CH_3$, the compound is methylaluminoxane (MAO).

The transition metal compound/compounds and/or the cocatalyst/cocatalysts can be used either as such in homogeneous form or individually or together in heterogeneous form on supports. The support material can be inorganic or organic in nature, e.g. silica gel; $B_2O_3$, $Al_2O_3$, $MgCl_2$, cellulose derivatives, starch and polymers or else sheet silicates such as montmorillonite.

Support materials are preferably pretreated thermally and/or chemically to set a defined water content or OH group concentration or to keep them as low as possible. An example of chemical pretreatment is the reaction of the support with an aluminum alkyl. Inorganic supports are frequently heated at from 100° C. to 1000° C. for from 1 to 100 hours before use. The surface area of such inorganic supports, preferably silica ($SiO_2$), is in the range from 10 to 1000 m²/g, preferably from 100 to 800 m²/g. The particle diameter is in the range from 0.1 to 500 microns (μm), preferably from 10 to 200 μm.

The ratio of cocatalyst to catalyst is in the range ≦100 000:1, preferably ≦10 000:1, more preferably ≦1000:1, most preferably ≦300:1.

i-Olefins and cycloolefins to be reacted in the homopolymerization or block polymerization include, for example, ethylene, propylene, 1-butene, i-butene, 1-pentene, 1-hexene, 1-octene, 3-methyl-1-butene, 4-methyl-1-pentene, 4-methyl-1-hexene.

The solution phase or the slurry phase can be formed from the comonomers alone, i.e. without use of an additional solvent. If an additional solvent is used, suitable solvents are inert solvents such as aliphatic or cycloaliphatic hydrocarbons, petroleum fractions or diesel oil fractions (if appropriate after hydrogenation), toluene, chlorobenzene, o-dichlorobenzene or chloronaphthalene. In the case of solvents having a low boiling point, maintenance of a liquid phase can be ensured by application of a sufficient reaction pressure; such relationships are known to those skilled in the art. According to the present invention, the polymerization is carried out in one or more reactors or reaction zones, e.g. in reactor cascades, and different polymerization conditions can be employed in different reactors. The polymerization process can be a high-pressure process in autoclaves or stirred reactors, a solution process or a bulk polymerization, a slurry phase process in stirred reactors or loop reactors or a gas-phase process, with the pressures for slurry, solution and gas-phase processes not going beyond 100 bar. Such polymerizations can also be carried out in the presence of hydrogen. All these processes have been known for a long time and are familiar to those skilled in the art.

"Living polymerization" using anionic initiators is a well-established process for polymerizing the monomers butadiene and styrene to produce tailored block copolymers.

The main characteristic feature of the "living polymerization" according to the present invention is that once the polymer chain has been started, it continues to grow as long as monomer is present. The molecular weight of the polymer therefore increases with the polymerization time, as does the yield. If all chains are initiated at the same time and all grow at an equal rate, the molecular weight distribution $M_w/M_n$ is narrow, i.e. <2 and can in the ideal case reach a value of 1.

In the case of the monomers ethylene, propylene and homologous 1-olefins polymerized using Ziegler/Natta catalysts, chain transfer reactions and termination reactions prevent living polymerization.

The molar mass of a polymer prepared by the process of the present invention can be set in a simple fashion via the polymerization time. The longer the polymerization time chosen, the longer the macromolecules formed and thus the higher the molar mass of the polymer. The limiting viscosity [η] is customarily employed as a measure of the molar mass. The molar mass can also be determined by gel permeation chromatography (GPC).

Since in the case of living polymerization the macromolecule continues to grow, one or more chemically different blocks can be produced in a simple fashion in the same macromolecule after the desired molecular size has been reached by successive addition of other monomers.

The individual blocks can be homopolymers or copolymers, i.e. they can be made up of one or more monomers.

The copolymer blocks can have a random, alternating or sequence-like structure.

In the case of homopolymer blocks containing a 1-olefin having at least 3 carbon atoms, the olefin units can be linked atactically, isotactically or syndiotactically.

Depending on the nature of these blocks, very different phases and thus material properties can be combined in one and the same material. The individual materials are frequently not compatible with one another, so that the property profile cannot be achieved simply by mixing the individual components A and B. Demixing takes place. Addition of a 2-block copolymer A-B makes A and B miscible. The block copolymer acts as a valuable compatibilizer.

2-block copolymers in which one block forms a (partially) crystalline or amorphous hard phase while the nature of the other block leads to an amorphous soft phase are of interest. In such a case, thermoplastics become compatible with rubbers. Compounding gives high-value materials in the form of elasticized, high-impact thermoplastics or in the form of rubbers having excellent green strength. Tailored 3-block copolymers (A-B-A) of the hard-soft-hard type give elastomers which crosslink physically and thus reversibly. They can be processed thermoplastically. They are therefore referred to as thermoplastic elastomers (TPEs).

Here, high melting points and low glass transition temperatures can be realized in the same material by means of appropriate block copolymers.

Important (partially) crystalline polymers forming hard phases and having a high melting point $T_m$ are, for example, HDPE, LLDPE, sPP, iPP.

Important partially crystalline or amorphous polymers forming soft phases and having a low glass transition temperature $T_g$ are, for instance, EPM, EBM, EHM, EOM, aPP, ePP or polymers of this type which can be crosslinked readily by chemical means, e.g. EPDM, EBDM, EHDM, EODM.

Hard amorphous phases having a high glass transition temperature $T_g$ are formed, for example, by cycloolefin-olefin copolymers (COCs), e.g. norbornene-ethylene copolymers.

For example, the present process makes it possible to prepare polyolefins as 2-block copolymers of the type

| | |
|---|---|
| HDPE-EPM, | HDPE-EPDM, |
| LLDPE-EPM, | LLDPE-EPDM, |
| sPP-EPM, | sPP-EPDM, |
| iPP-EPM, | iPP-EPDM, |
| COC-EPM, | COC-EPDM, |
| HDPE-EBM, | HDPE-EBDM, |
| LLDPE-EBM, | LLDPE-EBDM, |
| sPP-EBM, | sPP-EBDM, |
| iPP-EBM, | iPP-EBDM, |
| COC-EBM, | COC-EBDM, |
| HDPE-EHM, | HDPE-EHDM, |
| LLDPE-EHM, | LLDPE-EHDM, |
| sPP-EHM, | sPP-EHDM, |
| iPP-EHM, | iPP-EHDM, |
| COC-EHM, | COC-EHDM, |
| HDPE-EOM, | HDPE-EODM, |
| LLDPE-EOM, | LLDPE-EODM, |
| sPP-EOM, | sPP-EODM, |
| iPP-EOM, | iPP-EODM, |
| COC-EOM, | COC-EODM, |

Correspondingly, 3-block copolymers of the hard-soft-hard type can be prepared, e.g. sPP-EPM-sPP, sPP-EBM-sPP, iPP-EPM-iPP, iPP-EPDM-iPP, sPP-EHM-sPP, sPP-EOH-sPP, iPP-EHM-iPP, iPP-EO-iPP, COC-EPM-COC.

The process of the present invention for the living polymerization of olefins by means of D/A-metallocene catalysts makes it possible to obtain low, intermediate, high and, preferably, very high molar masses. An important advantage over normal non-living Ziegler/Natta polymerization is that all products can be prepared using one and the same catalyst at the same polymerization temperature. This is made possible by adapting the residence time (polymerization time).

When a further transition metal compound is introduced into the process of the present invention, it becomes possible to achieve bimodal molar mass distributions whose molar mass difference can be varied via the time for which the polymerization mixture is maintained in the temperature range of living polymerization. This effect is especially pronounced if in the chosen temperature range one catalyst maintains a living polymerization while the other one does not. With increasing polymerization time the living system builds up the molecular weight, while the non-living system produces more chains of the identical molecular weight.

Furthermore, the molar mass of the polymer or the polymer block can, according to the process of the invention, be set via the monomer/catalyst ratio chosen. The higher the ratio, the higher the theoretically achievable degree of polymerization at complete conversion.

After the desired block length (molar mass) has been reached, further chain growth can be prevented in various ways.

This occurs, for example, when the monomer is consumed or is brought about by removing unreacted monomer from the reactor. However, chain growth can also be stopped by increasing the temperature.

For this purpose, the temperature has to be selected so that it moves outside the temperature range of living polymerization and chain termination or chain transfer reactions take place as a result. This temperature can easily be determined for the catalyst used in each case, since at this temperature there is no longer a time-dependent increase in the limiting viscosity [η]. In this way, reactor blends of products of living and nonliving polymerization can also be produced by means of reaction zones at different temperatures.

It is also possible to select the polymerization temperature and the polymerization time so that part of the chains still "lives" while the other part of the polymer chains no longer bears a catalyst center as a result of chain termination and/or chain transfer and therefore no longer grows. A polymerization temperature $\geq 10°$ C. is preferably selected for this purpose. On the subsequent change to/introduction of a different monomer or a different monomer mixture, block copolymers are formed only from the "living chains". This too results in a reactor blend. At relatively high temperatures, β-H and β-CH$_3$ eliminations, for example, stop chain growth. Olefinically unsaturated chain ends are formed in this way.

A further possible way of stopping chain growth in a controlled fashion is addition of termination reagents, e.g. hydrogen. This addition leads to saturated non-functionalized chain ends.

The formation of terminally functionalized polymer chains is value and leads, depending on the termination reagent used, to nonpolar or to polar chain ends.

Butadiene produces, for example, vinyl or vinylene end groups after acid work-up. Addition of iodine to the living polymerization results in iodine-terminated chains. Carbon monoxide and subsequent acid work-up gives aldehyde end groups. Use of epoxides and removal of the catalyst fragment by means of acid results in hydroxy end groups; use of carbon dioxide results in formation of carboxyl end groups. Such macromolecules having reactive end groups (macromers) are in turn valuable intermediates for the targeted construction of block copolymers. In addition, polyolefins modified in a polar manner improve the ability of polyolefins to be colored.

The end group can make it possible for the macromers to undergo further addition, condensation, insertion, free-radical, cationic or anionic reactions.

If the reactive chain end is converted into a cationic chain end (e.g. R-I using silver salts), poly(THF) can be polymerized on using tetrahydrofuran or poly(caprolactam) can be polymerized on using, for example, caprolactam. Polyisobutylene can be attached to the polyolefin block by use of isobutylene. A lithium polystyrene formed by anionic polymerization can, for example, be coupled to an iodized chain end with elimination of lithium iodide. In an analogous fashion, the iodine-terminated chains can be reacted with lithium polybutadiene.

Block copolymers such as polyolefin-polystyrene, polyolefin-polybutadiene, polyolefin-polytetrahydrofuran are obtained by these routes.

EXAMPLES

Example 1

Fluorenyllithium Li[flu]

Li($C_{13}H_9$)

A solution of fluorene (11.09 g, 66.74 mmol) in 300 ml of dry pentane was admixed at −70° C. with BuLi (28.0 ml of a 2.5 molar solution, 70.0 mmol). The pale yellow solution obtained was stirred at room temperature under an argon atmosphere for 16 hours and then refluxed for 24 hours. The orange-yellow solution was filtered via a needle and the yellow residue was washed with pentane (2×100 ml, in each case for about 15 minutes under reflux) and filtered. The orange-yellow powder was dried to constant weight under a dynamic vacuum, giving 9.10 g (79.2%) of loose orange powder as pure fluorenyllithium product.

$^1$H-NMR: (400.13 MHz, THF-$d_8$), δ 7.86 (d, J=7.53 Hz, 2H), 7.25 (d, J=7.96 Hz, 2H), 6.75 (td, $J_1$=6.65 Hz, $J_2$=1.22 Hz, 2H), 6.37 (t, J=7.64 Hz, 2H), 5.88 (s, 1H)

Literature
1) J. B. Grutzner et al. *J. Amer. Chem. Soc* (1972), 94, 2306
2) J. J. Brooks et al. *J. Amer. Chem. Soc* (1972), 94, 7339
3) R. Zerger et al. *J. Amer. Chem. Soc* (1974), 96, 5441

Example 2

9-Diethylphosphinofluorenyllithium Li[$Et_2$P-flu]

Li[9-$(C_2H_5)_2$P—$(C_{13}H_8)$]

A suspension of fluorenyllithium, ($C_{13}H_9$)Li, (2.728 g, 15.85 mmol) in 30 ml of dry pentane was admixed at −70° C. with a solution of chlorodiethylphosphine, CIP$Et_2$, (1.974 g, 15.85 mmol) in 25 ml of pentane. The mixture was stirred briefly at −70° C. and then reacted at room temperature for 6 hours. The yellow suspension was filtered and the filtrate was freed of volatile components under reduced pressure, leaving 3.49 g (86.6%) of an orange oil which, according to 1-H- and 31-P-NMR spectroscopy, was 9-diethylphosphinofluorene. The resulting compound (9-diethylphosphinofluorene, 3.388 g, 13.3 mmol) was diluted with 45 ml of dry pentane and cooled to 0° C. The cooled solution was admixed with BuLi (5.4 ml of a 2.5 molar solution, 13.5 mmol) and stirred briefly. The mixture was stirred for another 4.5 hours at room temperature with occasional heating by means of a hair dryer, resulting in a few loose orange precipitates. The reaction mixture was filtered via a needle and the solid was washed with pentane (2×5 ml) and dried under reduced pressure, leaving an orange solid which, according to 1-H- and 31-P-NMR spectroscopy, was 9-diethyl-phosphinofluorenyllithium.

NMR:
$^1$H    (400.13 MHz, THF-$d_8$), δ7.79 (d, J = 7.5 Hz, 2H), 7.68 (d, J = 8.2 Hz, 2H), 6.76 (dt, $J_1$ = 6.8 Hz, $J_2$ = 1.3 Hz, 2H), 6.41 (dt, $J_1$ = 6.8 Hz, $J_2$ = 0.8 Hz, 2H =, 2.08 (m, 2H), 1.82 (m, 2H), 0.90 (m, 6H).
$^{31}$P    (161.9 MHz, THF-$d_8$), δ−40.4 (singlet)

Example 3

Diphenylbromoborane (diphenylboron bromide) $Ph_2BBr$ $(C_6H_5)_2BBr$ 43.3 g (101.4 mmol) of tetraphenyltin $SnPh_4$ were placed under argon in a 500 ml two-neck flask and cooled to −70° C. At −70° C., 50.8 g (202.8 mmol) of $BBr_3$ were added slowly by means of a syringe while stirring. At 0° C., a strongly exothermic reaction occurred, resulting in a brief rise in the internal temperature to about 40° C. The mixture was stirred at room temperature for 2 hours, then heated to 220° C. and maintained at this temperature for 2 hours. The product $Ph_2BBr$ was purified by fractional vacuum distillation.

B.p.$_{0.1}$ 90° C.–95° C.
Yield: 39.22 g (78.9% of theory)
$^{11}$B-NMR (128.4 MHz, $d_8$-toluene) δ+66.1 (singlet)

Example 4

Diphenylboranyltrimethylsilylcyclopentadiene $Ph_2$B-cp-Si$Me_3$ $(C_6H_5)_2$B-$(C_5H_4)$-Si$(CH_3)_3$ 9.69 g (70.1 mmol) of trimethylsilylcyclopentadiene (from Fluka) and 600 ml of n-pentane were placed under argon in a 1 l two-neck flask at −50° C. 43.8 ml (70.1 mmol) of butyllithium (BuLi, 1.6 molar in n-hexane) were added dropwise. After the addition of BuLi was complete, the yellow suspension was stirred overnight at room temperature. It was subsequently cooled to −20° C. and a solution of 17.16 g (70.1 mmol) of $Ph_2BBr$ in 50 ml of n-pentane was added dropwise at −20° C. The suspension was stirred overnight at room temperature, filtered through a D3 frit and the filtrate was evaporated to dryness. The product is a yellow oil which, according to NMR, is an isomer mixture.
Yield: 17.5 g (82.8%)

Example 5

1-Diphenylboranylcyclopentadienylzirconium trichloride [$Ph_2$B(cp)Zr$Cl_3$]

[$(C_6H_5)_2$B$(C_5H_4)$Zr$Cl_3$]

24.8 g (106.5 mmol) of zirconium tetrachloride and 150 ml of toluene were placed under argon in a 0.5 l two-neck flask. The white suspension was cooled to −20° C. and a solution of 30.68 g (101.4 mmol) of diphenylboranyltrimethylsilylcyclopentadiene in 150 ml of toluene was added. The brown suspension was stirred at room temperature for 24 hours and filtered through a D3 frit. The filtrate was evaporated to dryness under reduced pressure. The brown residue was stirred a number of times with n-hexane, giving a brown powder. This was dried to constant weight under reduced pressure.

Yield: 26.26 g (60.7% of theory)

Example 6

9-Diethylphosphinofluorenyl-1-diphenylboranylcyclopentadienylzirconium dichloride $[(flu)Et_2PBPh_2(cp)ZrCl_2]$, $[(C_{13}H_8)(C_2H_5)_2PB(C_6H_5)_2(C_5H_4)ZrCl_2]$ 0.63 g (2.4 mmol) of Li[Et$_2$P-flu] together with 60 ml of toluene were placed under argon in a Schlenk tube at room temperature, and a solution of 1.03 g (2.4 mmol) of Ph$_2$B(cp)ZrCl$_3$ in 30 ml of toluene was slowly added dropwise at room temperature. The suspension changed colour from yellow to brown. After 4 hours at room temperature, the suspension was filtered and the filtrate was evaporated to dryness and stirred 3 times with 15 ml of pentane. The light-brown residue was dried to constant weight.

Yield: 1.04 g (67% of theory)

| NMR: | |
|---|---|
| $^1$H | (400.13 MHz, CD$_2$Cl$_2$) δ +8.23 (d, 9 Hz, 2H, flu), +7.84 (d, 9 Hz, 2H, flu), +7.67 (pseudo-t, 7.7 Hz, 2H, flu), +7.4 (m, Ph) +7.35 (pseudo-t, 7.6 Hz, 2H, flu) +7.26 (m, Ph), +6.65 (m, 2H, cp), +6.25 (pseudo-t, 2.5 Hz, 2H, cp), +2.54 (m, 4H, CH$_2$), +1.04 (m, 6H, CH$_3$) |
| $^{11}$B | (128.38 MHz, CD$_2$Cl$_2$) δ −4.6 (broadened singlet) |
| $^{31}$P | (161.98 MHz, CD$_2$Cl$_2$) δ +30.0 (broadened singlet) |

Example 7

Bis(pentafluorophenyl)boranylcyclopentadienylzirconium trichloride, $(C_6F_5)_2B(C_5H_4)ZrCl_3$ A suspension of ZrCl$_4$ (1.92 g, 8.24 mmol) in 30 ml of toluene was admixed at room temperature with a solution of trimethylsilylbis(pentafluorophenyl)boranylcyclopentadiene, Me$_3$Si(C$_5$H$_4$)B(C$_6$F$_5$)$_2$, (4.0 g, 8.25 mmol) in 60 ml of toluene. The mixture was stirred overnight (16 hours) under Ar. After filtering the suspension, the light-yellow solid was washed with toluene (2×5 ml) and the loose solid was dried to constant weight under a pressure of 3×10$^{-3}$ mbar (3.88 g, 77.6%).

| NMR: | |
|---|---|
| $^1$H | (400.13 MHz, d$_8$-toluene); δ 6.87 (br. s), 6.51 (br. s), 6.46 (t, J = 2.5 Hz), 6.28 (t, J = 2.6 Hz). |
| $^{11}$B | (128.4 MHz, d$_8$-toluene); δ 54.3 (broad signal at 65-45 ppm with a maximum at 54.3 ppm). |
| $^{19}$F | (376.3 MHz, d$_8$-toluene); δ −127.3 (br. s), −128.4 (d, J = 19.9 Hz), −146.1 (br. s), −149.6 (d, J = 20.8 Hz), −160.0 (br. s), −161.3 (t, J = 16.1 Hz). |

Example 8

1-Bis(pentafluorophenyl)boranyl-2-methyl(indenyl) zirconium trichloride, $[1-(C_6F_5)_2B-(2-CH_3—C_9H_5)ZrCl_3]$ A suspension of zirconium tetrachloride (ZrCl$_4$) (2.84 g, 12.2 mmol) in 20 ml of toluene was admixed at 0° C. with a solution of trimethylstannyl-2-methylbis-(pentafluorophenyl)boranylindene (7.89 g, 12.2 mmol) in 30 ml of toluene. The mixture was allowed to warm to room temperature and stirred overnight under an argon atmosphere. The turbid orange solution obtained was filtered to remove small amounts of insoluble material and the filtrate was evaporated to dryness. The orange solid was taken up in 30 ml of hexane, stirred for 30 minutes and then filtered via a needle. The solid was then washed again with hexane (2×20 ml) and dried under reduced pressure, giving 6.71 g (82%) of a loose orange-yellow solid.

| NMR: | |
|---|---|
| $^1$H | (400.13 MHz, CD$_2$Cl$_2$), δ 7.88 (d, J = 8.2 Hz, 1H), 7.59 (m, 1H), 7.47 (m, 2H), 7.29 (s, 1H), 2.42 (s, 3H). |
| $^{11}$B | (128.4 MHz, CD$_2$Cl$_2$) δ 56.5 ppm (broad over a range of 45-65 ppm). |
| $^{19}$F | (376.3 MHz, CD$_2$Cl$_2$) δ −128.9 (d, J = 18.4 Hz, 4F, o-F), −149.2 (t, J = 20 Hz, 2F, p-F), −160.6 (m, 4F, m-F). |

Example 9

1-Dimethylphosphino-2-methylindenyl-1'-bis(pentafluorophenyl)boranyl-2'-methylindenylzirconium dichloride, $[(2-CH_3—C_9H_5)—(CH_3)_2PB(C_6F_5)_2-(2-CH_3—C_9H_5)ZrCl_2]$ A solution of 1-trimethylstannyl-2-methyl-3-dimethylphosphinoindene, 1-Me$_3$Sn-2-Me-3-Me$_2$P—C$_9$H$_5$, (0.598 g, 1.69 mmol) in 18 ml of toluene was added at room temperature by means of a syringe to a suspension of 1-bis(pentafluorophenyl)-boranyl-2-methylindenylzirconium trichloride, [1-(C$_6$F$_5$)$_2$B-2-Me-(C$_9$H$_5$)ZrCl$_3$], (1.136 g, 1.69 mmol) in 30 ml of toluene over a period of 10 minutes. The slightly turbid solution was heated on an oil bath at 60° C. for 6 hours with stirring. This resulted in formation of a large quantity of a yellow solid. The reaction mixture was cooled to room temperature and the supernatant liquid was filtered via a needle into another Schlenk tube. The solid was washed with toluene (3×5 ml) and hexane (2×5 ml), after which the washings were combined with the filtrate. The solid which remained was dried under reduced pressure, giving 0.71 g (50.8%) of a light-yellow microcrystalline solid. The NMR spectra of this solid in CD$_2$Cl$_2$ show mainly the rac isomer (rac isomer:meso isomer=90:10). The filtrate combined with the washings was evaporated to dryness, washed with hexane (2×20 ml) and dried under reduced pressure, giving 0.67 g (48%) of a yellow pulverulent product. The NMR spectra in CD$_2$Cl$_2$ show mainly the meso isomer (rac isomer:meso isomer=20:80). The total yield of the reaction is more than 98%, and under these reaction conditions the ratio of rac to meso is 62:38.

NMR:

$^1$H (400.13 MHz, CD$_2$Cl$_2$):

| | |
|---|---|
| rac isomer | δ 7.71 (d, J = 8.7 Hz, 1H), 7.55 (m, 2H), 7.38 (m, 2H), 7.26 (d, J = 7.6 Hz, 1H), 7.05 (m, 1H), 6.73 (s, 1H), 6.65 (d, J = 2.1 Hz, 1H), 2.26 (d, broadened, J = 10.7 Hz, 6H), 2.24 (s, 3H), 1.70 (s, 3H). |
| meso isomer | δ 7.71 (d, J = 8.6 Hz, 1H), 7.47 (d, J = 8.5 Hz, 1H), 7.40 (d, J = 8.5 Hz, 1H), 7.26 (t, J = 6.7 Hz, 1H), 7.04 (t, J = 8.0 Hz, 2H), 6.79 (s, 1H), 6.60 (s, 1H), 6.56 (s, 2H), 2.59 (s, 3H), 2.43 (s, 3H), 2.27 (dd, J = 9.8 Hz, 6H). |

$^{11}$B (128.4 MHz, CD$_2$Cl$_2$):

| | |
|---|---|
| rac isomer | δ −7.09 (singlet) |
| meso isomer | δ −7.04 (singlet) |

$^{19}$F (376.3 MHz, CD$_2$Cl$_2$):

| | |
|---|---|
| rac isomer | δ −124.6 (m, 1F, o-F), −127.2 (broad s, 2F, o-F), −128.6 (m, 1F, o-F), −157.3 (t, J = 20.8 Hz, 1F, p-F), −157.6 (t, J = 20.5 Hz, 1F, p-F), −161.8 (m, 1F, m-F), −163.0 (m, 2F, m-F), −163.7 (m, 1F, m-F). |
| meso isomer | δ −124.2 (m, 1F, o-F), −127.6 (broad, 3F, o-F), −157.4 (m, 2F, p-F, −161 to −163 (broad, 4F, m-F). |

$^{31}$P (161.9 MHz, CD$_2$Cl$_2$):

| | |
|---|---|
| rac isomer | δ 18.9 (broad multiplet). |
| meso isomer | δ 17.75 (broad multiplet). |

Example 10

9-Diethylphosphinofluorenylbis(pentafluorophenyl)boranylcyclopentadienyl-zirconium dichloride,

[(C$_{13}$H$_8$)(C$_2$H$_5$)$_2$PB(C$_6$F$_5$)$_2$(C$_5$H$_4$)ZrCl$_2$]

A solution of bis(pentafluorophenyl)boranylcyclopentadienylzirconium trichloride, (F$_5$C$_6$)$_2$BCpZrCl$_3$, (0.548 g, 0.903 mmol) in 25 ml of toluene was added at room temperature by means of a syringe to a suspension of 9-diethylphosphinofluorenyllithium, Li[9-Et$_2$P—(C$_{13}$H$_8$)], (0.235 g, 0.903 mmol) in 15 ml of toluene over a period of 10 minutes. After the addition was complete, the mixture became brownish red. After stirring overnight under an Ar atmosphere, the turbid solution was filtered through Celite to remove LiCl. The clear orange-red solution was evaporated to dryness, leaving a dense orange solid which was washed with pentane (2×15 ml) and dried. This gave 0.71 g (95%) of a dense yellowish-orange microcrystalline solid. This was, according to NMR analysis, the title compound.

NMR-spectroscopic characterization:

| | |
|---|---|
| $^1$H | (400.13 MHz, C$_6$D$_6$), δ 7.94 (d, J = 8.3 Hz, 2H), 7.53 (d, J = 8.6 Hz, 2H), 7.45 (pseudo-t, J = 7.7 Hz, 2H), 7.19 (pseudo-t, J = 8.3 Hz, 2H), 6.37 (m, 2H), 6.06 (s, 2H), 2.42 (m, 2H), 2.04 (m, 2H), 0.38 (m, 6H). |
| $^{11}$B | (128.4 MHz, C$_6$D$_6$), δ −9.3 (br. s.). |
| $^{19}$F | (376.9 MHz, C$_6$D$_6$), δ −125.2 (d, J = 22 Hz, 4F, o-F), −155.5 (t, J = 21 Hz, 2F, p-F), −162.2 (t, J = 22 Hz, 4F, m-F). |
| $^{31}$P | (161.9 MHz, C$_6$D$_6$), δ 35.1 (br. s.). |

Example 11

9-Diethylphosphinofluorenyl-1-Bis(pentafluorophenyl)boranyl-2-methyl-indenylzirconium dichloride,

[(C$_{13}$H$_8$)—(C$_2$H$_5$)$_2$PB(C$_6$F$_5$)$_2$-(2-CH$_3$—C$_9$H$_5$)ZrCl$_2$]

A solution of 1-bis(pentafluorophenyl)boranyl-2-methyl-indenylzirconium trichloride, [1-(F$_5$C$_6$)$_2$B-2-Me—(C$_9$H$_5$)ZrCl$_3$], (0.75 g, 1.11 mmol) in 30 ml of toluene was added at room temperature by means of a syringe to a suspension of 9-diethylphosphinofluorenyllithium, Li[9-Et$_2$P—(C$_{13}$H$_8$)], (0.29 g, 1.11 mmol) in 15 ml of toluene over a period of 10 minutes. The orange-red suspension was stirred overnight under an Ar atmosphere and then filtered through Celite, after which the solid was washed with CH$_2$Cl$_2$ to improve dissolution of the product. The combined filtrates were evaporated to dryness to leave an orange residue which was washed with pentane (3×15 ml). The orange powder was dried under a high vacuum (1.0×10$^{-3}$ mbar), leaving 0.81 g (82%) of product in the form of an orange powder. This was, according to NMR-spectroscopic analysis, the title compound,

[(C$_{13}$H$_8$)-9-Et$_2$PB(C$_6$F$_5$)$_2$-2-Me—(C$_9$H$_5$)ZrCl$_2$].

NMR-spectroscopic characterization:

| | |
|---|---|
| $^1$H | (400.13 MHz, C$_6$D$_6$), δ 7.75 (t, J = 8.7 Hz, 2H), 7.66 (d, J = 8.2 Hz, 1H), 7.50 (t, J = 8.5 Hz, 2H), 7.43 (d, J = 8.9 Hz, 1H), 7.34 (d, J = 8.4 Hz, 1H), 7.29 (d, J = 8.4 Hz, 1H), 7.17 (t, J = 8.3 Hz, 1H), 6.99 (t, J = 8.3 Hz, 1H), 6.97 (t, J = 8.1 Hz, 1H), 6.76 (t, J = 7.8 Hz, 1H), 6.60 (s, 1H), 2.93–2.87 (m, 1H), 2.63–2.43 (m, 3H), 0.65 (m, J = 7.3 Hz, 3H), 0.52 (m, 3H). |
| $^{11}$B | (128.4 MHz, C$_6$D$_6$), δ −6.20 ppm (broad singlet). |
| $^{19}$F | (376.3 MHz, C$_6$D$_6$), δ −126.3 (s, 3F, o-F), −130.1 (m, 1F, o-F), −155.7 (m, 2F, p-F), −160.5 (m, 1F, m-F), −162.2 (s, 3F, m-F). |
| $^{31}$P | (161.9 MHz, C$_6$D$_6$), δ 45.3 ppm (br. s.) |

Example 12

Polymerization Of Propene

A dry, oxygen-free, mechanically stirred 1.4 l V4A steel autoclave provided with jacket cooling was charged with 600 g of toluene at 20° C., and 200 g of propene were subsequently introduced via a pressure lock. At an internal temperature of 10° C. and an internal pressure of 5.1 bar, the catalyst was added via a pressure lock. The catalyst employed comprised 20×10$^{-6}$ mol of [(flu)Et$_2$PBEt$_2$(cp)ZrCl$_2$] and 13.2 ml of a 10% strength MAO solution in toluene (20 mmol of Al). During the polymerization, samples were taken at various times and analyzed. For this purpose, the polymer formed in each case was precipitated with ethanol, stirred with ethanol/hydrochloric acid 90/10, filtered, washed with ethanol and dried to constant weight at 80° C. in a vacuum drying oven. After 180 minutes, the entire polymer formed was worked up as above.

Polymer yield after 10 min

| | |
|---|---|
| at a reactor temperature of 10.7° C.: | 1.17 g (0.58% conversion) |
| calculated catalyst activity: | 0.351 tonnes of PP per mol of Zr and hour |
| limiting viscosity in ortho-dichlorobenzene at 140° C.: | $[\eta] = 2.11$ dl/g |

Polymer yield after 15 min

| | |
|---|---|
| at a reactor temperature of 9.6° C.: | 1.96 g (0.98% conversion) |
| calculated catalyst activity: | 0.392 tonnes of PP per mol of Zr and hour |
| limiting viscosity in ortho-dichlorobenzene at 140° C.: | $[\eta] = 2.71$ dl/g |

Polymer yield after 20 min

| | |
|---|---|
| at a reactor temperature of 8.6° C.: | 3.03 g (1.52% conversion) |
| calculated catalyst activity: | 0.455 tonnes of PP per mol of Zr and hour |
| limiting viscosity in ortho-dichlorobenzene at 140° C.: | $[\eta] = 3.07$ dl/g |
| GPC: (universal calibration using polystyrene standards) | $M_w = 352$ kg/mol $M_n = 216$ kg/mol PD = 1.63 |
| Number of polymer chains formed per catalyst molecule: | $N_C = 0.70$ |

Polymer yield after 30 min

| | |
|---|---|
| at a reactor temperature of 8.1° C.: | 5.17 g (2.59% conversion) |
| calculated catalyst activity: | 0.517 tonnes of PP per mol of Zr and hour |
| limiting viscosity in ortho-dichlorobenzene at 140° C.: | $[\eta] = 3.87$ dl/g |

Polymer yield after 40 min

| | |
|---|---|
| at a reactor temperature of 9.3° C.: | 7.18 g (3.59% conversion) |
| calculated catalyst activity: | 0.539 tonnes of PP per mol of Zr and hour |
| limiting viscosity in ortho-dichlorobenzene at 140° C.: | $[\eta] = 4.34$ dl/g |

Polymer yield after 50 min

| | |
|---|---|
| at a reactor temperature of 10.3° C.: | 9.14 g (4.57% conversion) |
| calculated catalyst activity: | 0.548 tonnes of PP per mol of Zr and hour |
| limiting viscosity in ortho-dichlorobenzene at 140° C.: | $[\eta] = 4.76$ dl/g |

Polymer yield after 60 min

| | |
|---|---|
| at a reactor temperature of 9.8° C.: | 11.00 g (5.50% conversion) |
| calculated catalyst activity: | 0.550 tonnes of PP per mol of Zr and hour |
| limiting viscosity in ortho-dichlorobenzene at 140° C.: | $[\eta] = 5.20$ dl/g |

Polymer yield after 180 min:

| | |
|---|---|
| calculated catalyst activity: | 29.92 g (14.96% conversion) 0.499 tonnes of PP per mol of Zr and hour |
| limiting viscosity in ortho-dichlorobenzene at 140° C.: | $[\eta] = 7.26$ dl/g |

Example 13

Polymerization of Propene

The polymerization was carried out as in Example 12, but at 0° C. and 3.9 bar and using $25 \times 10^{-6}$ mol of [(flu)Et$_2$PBEt$_2$(cp)ZrCl$_2$] and 16.5 ml of a 10% strength solution of MAO in toluene (25 mmol of Al).

Polymer yield after 180 min:

| | |
|---|---|
| calculated catalyst activity: | 26.63 g (13.32% conversion) 0.355 tonnes of PP per mol of Zr and hour |
| limiting viscosity in ortho-dichlorobenzene at 140° C.: | $[\eta] = 10.78$ dl/g |

$^{13}$C-NMR (triad analysis):

| | |
|---|---|
| rrrr: | 63% |
| rr: | 82% |
| mr/rm: | 16% |
| mm: | 3% |
| SI: | 89% |

DSC: (1st heating)

| | |
|---|---|
| Melting point: | $T_m = 100°$ C. |
| Enthalpy of fusion: | $H_m = 50$ J/g |
| Glass transition temperature: | $T_g = 4°$ C. |

DSC: (2nd heating)

| | |
|---|---|
| Melting point: | $T_m = 86°$ C. |
| Enthalpy of fusion: | $H_m = 4$ J/g |
| Glass transition temperature: | $T_g = 1°$ C. |

Example 14

Polymerization Of Propene

A dry, oxygen-free, mechanically stirred 1.4 l V4A steel autoclave provided with jacket cooling was charged with 600 g of toluene at 20° C., and 200 g of propene were subsequently introduced via a pressure lock. At an internal temperature of −8° C. and an internal pressure of 2.2 bar, the catalyst was added via a pressure lock. The catalyst employed comprised $15 \times 10^{-6}$ mol of [(flu)Et$_2$PBPh$_2$(cp)ZrCl$_2$] and 9.9 ml of a 10% strength MAO solution in toluene (15 mmol of Al). During the polymerization, samples were taken at various times and analyzed. For this purpose, the polymer formed in each case was precipitated with ethanol, stirred with ethanol/hydrochloric acid 90/10, filtered, washed with ethanol and dried to constant weight at 80° C. in a vacuum drying oven. The limiting viscosity $[\eta]$ of the sample taken after 30 minutes was 3.03 dl/g, measured in ortho-dichlorobenzene at 140° C.

Polymer yield after 60 min

| | |
|---|---|
| at a reactor temperature of −8.3° C.: | 4.82 g (2.41% conversion) |
| calculated catalyst activity: | 0.321 tonnes of PP per mol of Zr and hour |
| limiting viscosity in ortho-dichlorobenzene at 140° C.: | $[\eta] = 5.44$ dl/g |

Example 15

The polymerization was carried out as in Example 14. The experiment was stopped after 180 minutes, and the polymer was worked up and analzyed.

Limiting viscosity in ortho-dichlorobenzene at 140° C.: $[\eta] = 10.42$ dl/g

| $^{13}$C-NMR (triad analysis): | |
| --- | --- |
| rrrr: | 64% |
| rr: | 79% |
| mr/rm: | 16% |
| mm: | 5% |
| SI: | 87% |
| DSC: (1st heating) | |
| Melting point: | $T_m$ = 100° C. |
| Enthalpy of fusion: | $H_m$ = 55 J/g |
| Glass transition temperature: | $T_g$ = 3° C. |
| DSC: (2nd heating) | |
| Melting point: | $T_m$ = 94° C. |
| Enthalpy of fusion: | $H_m$ = 1 J/g |
| Glass transition temperature: | Tg = 0° C. |

Example 16

Polymerization Of Propene 60 g of toluene were placed in a dry, oxygen-free 300 ml V4A steel autoclave at 20° C., and 0.6 mmol of TIBA (1 m in toluene) as scavenger and subsequently 20 g of propene were condensed in. At an internal temperature of 0° C. and an internal pressure of 2 bar, the catalyst was added via a pressure lock. The catalyst employed comprised $2\times10^{-6}$ mol of [(flu)Et$_2$PBPh$_2$(cp)ZrCl$_2$] in 0.4 ml of a 10% strength trimethylolaluminum-free solution of MAO in toluene (0.6 mmol of Al). Four polymerizations were carried out in the temperature range from −1° C. to +1° C. and stopped after 15, 30, 45, 60 minutes. The polypropene formed was precipitated in ethanol, stirred with ethanol/hydrochloric acid 90:10, filtered, washed with ethanol and dried to constant weight at 80° C. in a vacuum drying oven and the limiting viscosity of the four samples was determined. These displayed a linear increase with the polymerization time, in agreement with a living polymerization mechanism.

| | |
| --- | --- |
| Limiting viscosity in ortho-dichlorobenzene at 140° C. after 15 minutes: | $[\eta]$ = 3.73 dl/g |
| Limiting viscosity in ortho-dichlorobenzene at 140° C. after 30 minutes: | $[\eta]$ = 4.93 dl/g |
| Limiting viscosity in ortho-dichlorobenzene at 140° C. after 45 minutes: | $[\eta]$ = 6.41 dl/g |
| Limiting viscosity in ortho-dichlorobenzene at 140° C. after 60 minutes: | $[\eta]$ = 8.14 dl/g |
| Polymer yield after 60 minutes: | 1.28 g (6.4% conversion) |
| Catalyst activity: | 0.64 tonnes of PP per mol of Zr and hour |

Example 17

Copolymerization of Ethene with Propene

A dry, oxygen-free, mechanically stirred 1.4 l V4A steel autoclave provided with jacket cooling was charged with 500 ml of toluene at 20° C., and 50 g of propene were subsequently added via a pressure lock. At an internal temperature of 0° C., the pressure was increased from 1.5 bar to 5.5 bar by means of ethene. The catalyst was added via a pressure lock. The catalyst employed comprised $7\times10^{-6}$ mol of [(flu)Et$_2$PBPh$_2$(cp)ZrCl$_2$] and 4.62 ml of a 10% strength solution of MAO in toluene (7 mmol of Al). During the polymerization, samples were taken at various times and analyzed. The polymer formed in each case was precipitated in ethanol, stirred with ethanol/hydrochloric acid 90/10, filtered, washed with ethanol and dried to constant weight at 80° C. in a vacuum drying oven and the limiting viscosity was determined.

Polymer sample after 5 min at a reactor temperature of −0.5° C.:
Limiting viscosity in ortho-dichlorobenzene at 140° C.: $[\eta]$=6.65 dl/g
Polymer sample after 10 min at a reactor temperature of 0.8° C.:
Limiting viscosity in ortho-dichlorobenzene at 140° C.: $[\eta]$=7.51 dl/g
Polymer sample after 15 min at a reactor temperature of 3.4° C.:
Limiting viscosity in ortho-dichlorobenzene at 140° C.: $[\eta]$=9.61 dl/g
Polymer sample after 20 min at a reactor temperature of 7.2° C.:
Limiting viscosity in ortho-dichlorobenzene at 140° C.: $[\eta]$=10.86 dl/g
Polymer sample after 30 min at a reactor temperature of 10.0° C.:
Limiting viscosity in ortho-dichlorobenzene at 140° C.: $[\eta]$=12.78 dl/g Example 18

Polymerization Of Propene

A dry, oxygen-free, mechanically stirred 1.4 l V4A steel autoclave provided with jacket cooling was charged with 600 g of toluene at 20° C., and 200 g of propene were subsequently added via a pressure lock. At an internal temperature of −8° C. and an internal pressure of 2.8 bar, the catalyst was added via a pressure lock. The catalyst employed comprised $15\times10^{-6}$ mol of [(flu)Et$_2$PB(C$_6$F$_5$)$_2$(cp)ZrCl$_2$] and 9.9 ml of a 10% strength solution of MAO in toluene (15 mmol of Al). During the polymerization, samples were taken at various times and analyzed. The polymer formed in each case was precipitated in ethanol, stirred with ethanol/hydrochloric acid 90/10, filtered, washed with ethanol and dried to constant weight at 80° C. in a vacuum drying oven and the polymer yield and the conversion were determined.

The linear increase in molecular weight ($M_n$) with polymerization time confirms a living polymerization (FIG. 1).

| Polymer yield after 30 min | |
| --- | --- |
| at a reactor temperature of −7.3° C.: | 3.05 g (1.52% conversion) |
| calculated catalyst activity: | 0.407 tonnes of PP per mol of Zr and hour |
| Limiting viscosity in ortho-dichlorobenzene at 140° C.: | $[\eta]$ = 2.89 dl/g |
| GPC: (universal calibration using polystyrene standards) | $M_w$ = 407 kg/mol $M_n$ = 280 kg/mol PD = 1.45 |
| Polymer yield after 40 min | |
| at a reactor temperature of −7.1° C.: | 4.70 g (2.35% conversion) |
| Calculated catalyst activity: | 0.470 tonnes of PP per mol of Zr and hour |

-continued

| | |
|---|---|
| Limiting viscosity in ortho-dichlorobenzene at 140° C.: | $[\eta]$ = 3.60 dl/g |
| GPC: (universal calibration using polystyrene standards) | $M_w$ = 559 kg/mol<br>$M_n$ = 358 kg/mol<br>PD = 1.56 |
| Polymer yield after 50 min | |
| at a reactor temperature of −6.5° C.:<br>calculated catalyst activity: | 6.60 g (3.30% conversion)<br>0.528 tonnes of PP per mol of Zr and hour |
| Limiting viscosity in ortho-dichlorobenzene at 140° C.: | $[\eta]$ = 4.17 dl/g |
| GPC: (universal calibration using polystyrene standards) | $M_w$ = 694 kg/mol<br>$M_n$ = 450 kg/mol<br>PD = 1.54 |
| Polymer yield after 60 min | |
| at a reactor temperature of −5.6° C.:<br>calculated catalyst activity: | 8.86 g (4.43% conversion)<br>0.591 tonnes of PP per mol of Zr and hour |
| Limiting viscosity in ortho-dichlorobenzene at 140° C.: | $[\eta]$ = 4.75 dl/g |
| GPC: (universal calibration using polystyrene standards) | $M_w$ = 856 kg/mol<br>$M_n$ = 531 kg/mol<br>PD = 1.61 |

Example 19

The polymerization was carried out as in Example 18. The experiment was stopped after 180 minutes, and the polymer was worked up and analzyed.

Limiting viscosity in ortho-dichlorobenzene at 140° C.: $[\eta]$=9.63 dl/g

| | |
|---|---|
| $^{13}$C-NMR (triad analysis): | |
| rrrr: | 27% |
| rr: | 52% |
| mr/rm: | 36% |
| mm: | 13% |
| SI: | 69% |
| DSC: (1st heating) | |
| Melting point: | $T_m$ = 94° C. |
| Enthalpy of fusion: | $H_m$ = 13 J/g |
| Glass transition temperature: | $T_g$ = 1° C. |
| DSC: (2nd heating) | |
| Melting point: | $T_m$ = 0° C. |

Example 20

Copolymerization of Ethene with Propene

A dry, oxygen-free, mechanically stirred 1.4 l V4A steel autoclave provided with jacket cooling was charged with 500 ml of toluene at 20° C., and 50 g of propene were subsequently added via a pressure lock. At an internal temperature of 0° C., the pressure was increased from 1.4 bar to 5.4 bar by means of ethene. The catalyst was added via a pressure lock. The catalyst employed comprised 7×10$^{-6}$ mol of [(flu)Et$_2$PB(C$_6$F$_2$)$_2$(cp)ZrCl$_2$] and 4.62 ml of a 10% strength solution of MAO in toluene (7 mmol of Al). During the polymerization, samples were taken at various times and analyzed. The polymer formed in each case was precipitated in ethanol, stirred with ethanol/hydrochloric acid 90/10, filtered, washed with ethanol and dried to constant weight at 80° C. in a vacuum drying oven and the limiting viscosity and the composition were determined.

| | |
|---|---|
| Polymer sample after 10 min at a reactor temperature of 0.4° C.: | |
| Limiting viscosity in ortho-dichlorobenzene at 140° C.:<br>FTIR: | $[\eta]$ = 5.11 dl/g |
| Propene:<br>Ethene: | 50% by weight<br>50% by weight |
| GPC: (universal calibration using polystyrene standards) | $M_w$ = 646 kg/mol<br>$M_n$ = 402 kg/mol<br>PD = 1.61 |
| Polymer sample after 15 min at a reactor temperature of 2.5° C.: | |
| Limiting viscosity in ortho-dichlorobenzene at 140° C.:<br>FTIR: | $[\eta]$ = 7.15 dl/g |
| Propene:<br>Ethene: | 50% by weight<br>50% by weight |
| Polymer sample after 20 min at a reactor temperature of 5.0° C.: | |
| Limiting viscosity in ortho-dichlorobenzene at 140° C.:<br>FTIR: | $[\eta]$ = 8.37 dl/g |
| Propene:<br>Ethene: | 50% by weight<br>50% by weight |
| Polymer sample after 30 min at a reactor temperature of 11.3° C.: | |
| Limiting viscosity in ortho-dichlorobenzene at 140° C.:<br>FTIR: | $[\eta]$ = 11.30 dl/g |
| Propene:<br>Ethene: | 49% by weight<br>51% by weight |

Example 21

Polymerization of Propene 60 g of toluene were placed in a dry, oxygen-free 300 ml V4A steel autoclave 20° C., and 20 g of propene were subsequently condensed in. At an internal temperature of −10° C. and an internal pressure of 1.5 bar, the catalyst was added via a pressure lock. The catalyst employed comprised 2.5×10$^{-6}$ mol of [(flu)Et$_2$PB(C$_6$F$_5$)$_2$(2-Me-ind)ZrCl$_2$] in 1.65 ml of a 10% strength solution of MAO in toluene (2.5 mmol of Al). Four polymerizations were carried out at −10° C. and stopped after 15, 30, 45, 60 minutes. The polypropene formed was precipitated in ethanol, stirred with ethanol/hydrochloric acid 90/10, filtered, washed with ethanol and dried to constant weight at 80° C. in a vacuum drying oven and the limiting viscosity of the four samples was determined. These showed a linear increase with the polymerization time, in agreement with a living polymerization mechanism.

Figure 2:
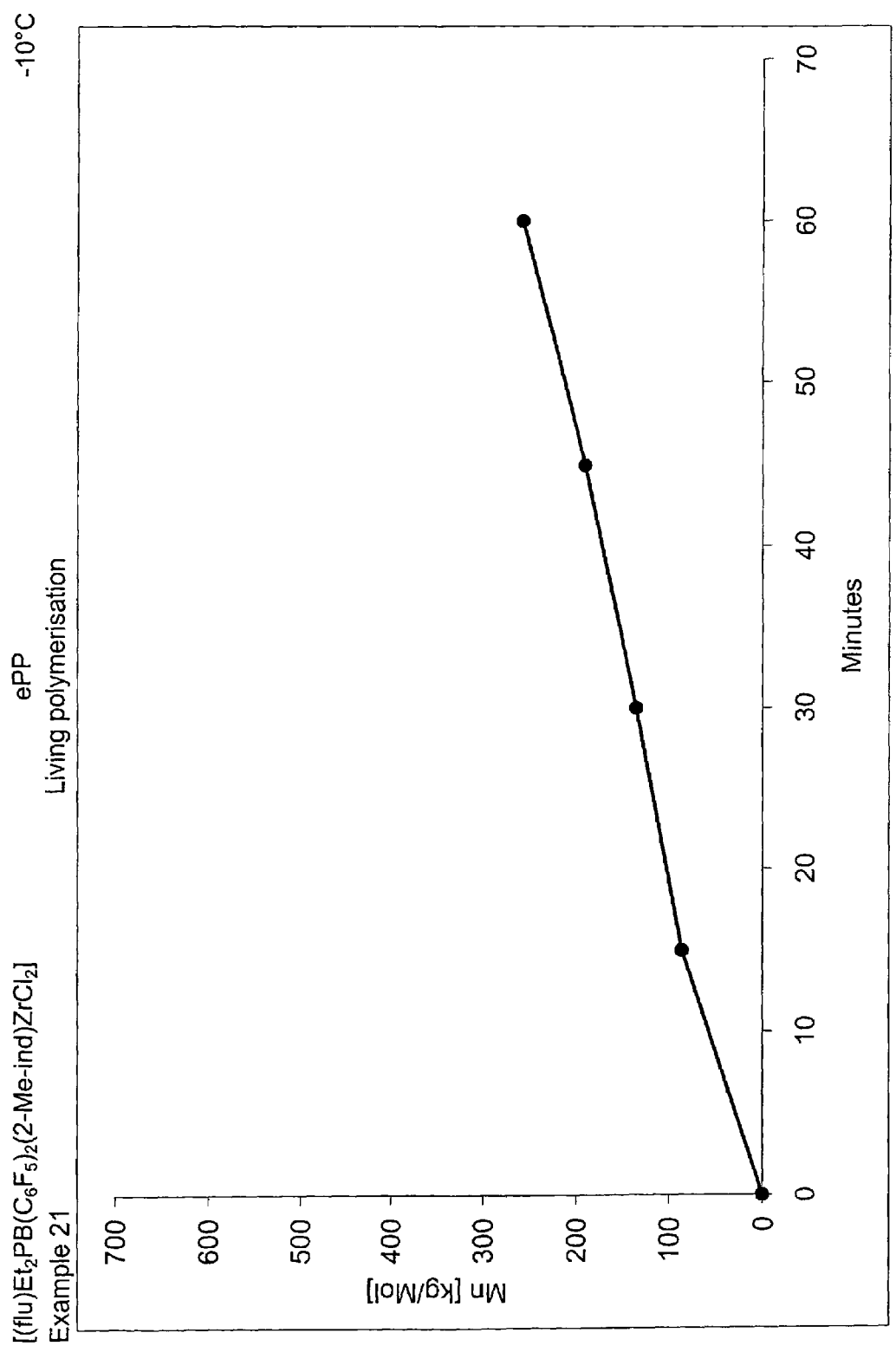
FIG. 2 graphically illustrates a living polymerization in accordance with Example 21, wherein said graphical illustration plots Molecular Weight, Mn, (Kg/Mol) versus Time (Minutes).

The linear increase in molecular weight ($M_n$ from GPC measurements) with polymerization time also confirms a living polymerization (FIG. 2).

Limiting viscosity in ortho-dichlorobenzene at 140° C. after 15 minutes: $[\eta]$=1.30 dl/g Limiting viscosity in ortho-dichlorobenzene at 140° C. after 30 minutes: $[\eta]$=2.05 dl/g Limiting viscosity in ortho-dichlorobenzene at 140° C. after 45 minutes: $[\eta]$=2.90 dl/g Limiting viscosity in ortho-dichlorobenzene at 140° C. after 60 minutes: $[\eta]$=3.32 dl/g

| | |
|---|---|
| Limiting viscosity in ortho-dichlorobenzen at 140° C. after 15 minutes: | [η] = 1.30 dl/g |
| Limiting viscosity in ortho-dichlrobenzene at 140° C. after 15 minutes: | [η] = 2.05 dl/g |
| Limiting viscosity in ortho-dichlorobenzene at 140° C. after 45 minutes: | [η] = 2.90 dl/g |
| Limiting viscosity in ortho-dichlorobenzene at 140° C. after 60 minutes: | [η] = 3.32 dl/g |
| Polymer yield after 60 minutes: | 0.98 g (4.9% conversion) |
| Catalyst activity: | 0.392 tonnes of PP per mol of Zr and hour |
| $^{13}$C-NMR (triad analysis): | |
| mm: | 58% |
| mr/rm: | 29% |
| rr: | 13% |
| Isotacticity index: | 72% |
| DSC: (2nd heating) | |
| Melting point: | $T_m$ = 137° C. |
| Enthalpy of fusion: | $H_m$ = 3 J/g |
| Glass transition temperature: | $T_g$ = −6° C. |

Example 22

Polymerization of Propene

The polymerization was carried out as in Example 21, but at 0° C. and 2.5 bar.

| | |
|---|---|
| Limiting viscosity in ortho-dichlorobenzene at 140° C. after 15 minutes: | [η] = 1.85 dl/g |
| GPC: (universal calibration using polystyrene standards) | |
| $M_w$ = 236 kg/mol | |
| $M_n$ = 45 kg/mol | |
| PD = 1.62 | |
| Limiting viscosity in ortho-dichlorobenzene at 140° C. after 60 minutes: | [η] = 3.35 dl/g |
| Polymer yield after 60 minutes: | 2.95 g (14.8% conversion) |
| Catalyst activity: | 1.18 tonnes of PP per mol |
| of Zr and hour | |
| DSC: (1st heating) | |
| Melting point: | $T_m$ = 140° C. |
| Enthalpy of fusion: | $H_m$ = 8 J/g |
| Glass transition temperature: | $T_g$ = −7° C. |

Example 23

Copolymerization of Ethene with Propene

A dry, oxygen-free, mechanically stirred 1.4 l V4A steel autoclave provided with jacket cooling was charged with 1000 ml of toluene at 20° C., and 50 g of propene were subsequently added via a pressure lock. At an internal temperature of 0° C., the pressure was increased from 0.8 bar to 2.8 bar by means of ethene. The catalyst was added via a pressure lock. The catalyst employed comprised $7 \times 10^{-6}$ mol of [(flu)Et$_2$PBEt$_2$(cp)ZrCl$_2$] and 4.62 ml of a 10% strength solution of MAO in toluene (7 mmol of Al). During the polymerization, samples were taken at various times and analyzed. The polymer formed in each case was precipitated in ethanol, stirred with ethanol/hydrochloric acid 90/10, filtered, washed with ethanol and dried to constant weight at 80° C. in a vacuum drying oven and the limiting viscosity was determined.

Figure 3:
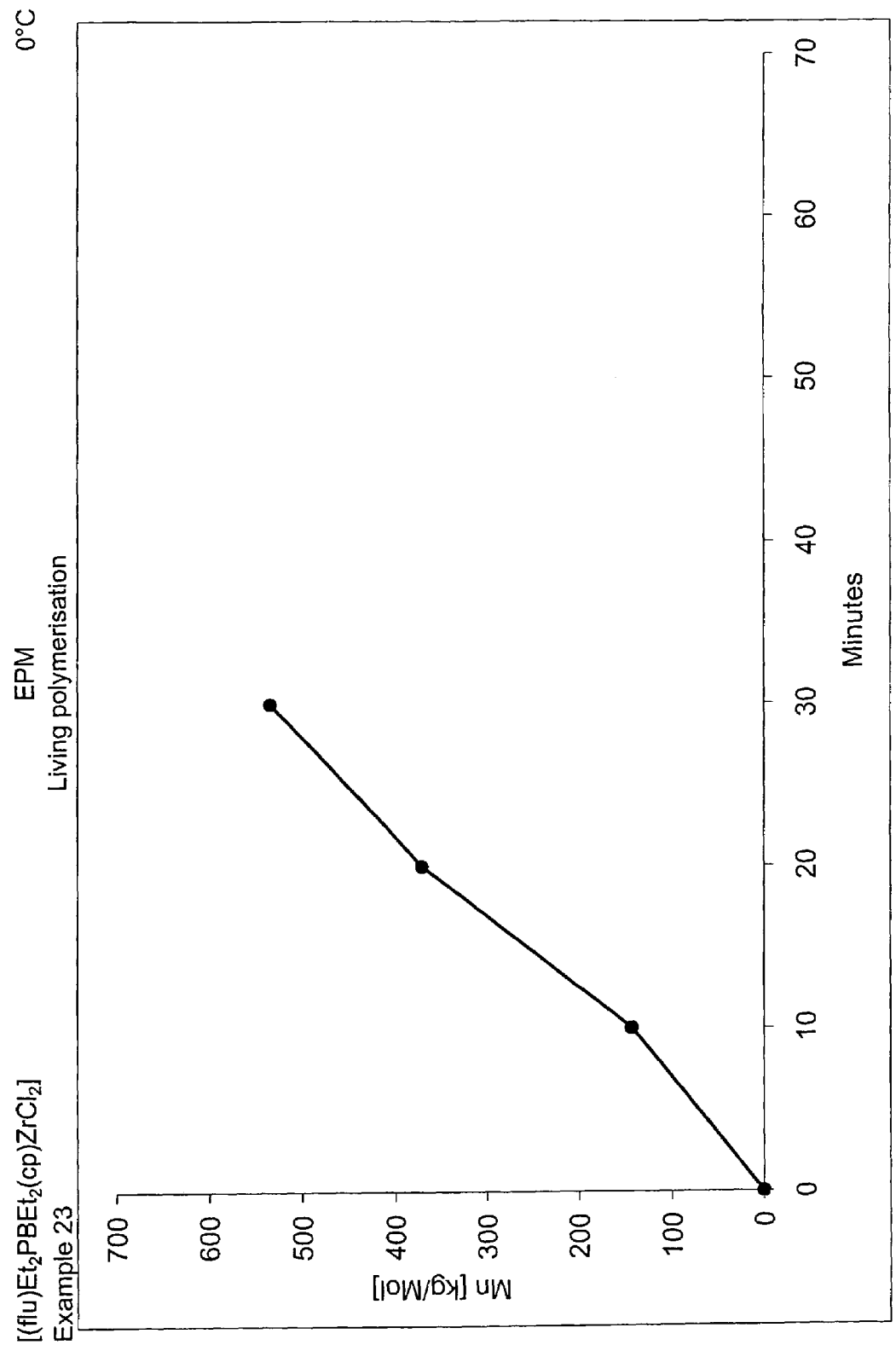
FIG. 3 graphically illustrates a living polymerization in accordance with Example 23, wherein said graphical illustration plots Molecular Weight, Mn, (Kg/Mol) versus Time (Minute).

The linear increase in molecular weight ($M_n$ from GPC measurements) with polymerization time also confirms a living polymerization (FIG. 3).

Polymer sample after 10 min at a reactor temperature of −0.8° C.:
Limiting viscosity in ortho-dichlorobenzene at 140° C.: [η]=3.42 dl/g Polymer sample after 20 min at a reactor temperature of 1.3° C.:
Limiting viscosity in ortho-dichlorobenzene at 140° C.: [η]=5.92 dl/g Polymer sample after 30 min at a reactor temperature of 2.8° C.:

| | |
|---|---|
| Limiting viscosity in ortho-dichlorobenzene at 140° C.: | [η] = 8.36 dl/g |
| DSC: (sec. heating) | |
| Melting point: | $T_m$ = −9/98° C. |
| Enthalpy of fusion: | $H_m$ = 26 J/g |
| Glass transition temperature: | $T_g$ = −54° C. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for preparing homopolymers, copolymers or block copolymers of one or more 1-olefins, comprising adding one or more monomer in succession in the presence of transition metal compounds having a fluorenyl ligand, at least one further ligand and at least one donor-acceptor interaction between the ligands or reaction products of these transition metal compounds and a cocatalyst(s), wherein the process is carried out in the temperature range from −40° to +15° C.

2. The process according to claim 1, wherein the at least one further ligand is a cyclopentadienyl ligand or a substituted cyclopentadienyl ligand.

3. The process according to claim 1, wherein the homopolymer(s) and copolymer(s) have a polydispersity $M_w/M_n$ in the range from 1 to 2.

4. A process for preparing 2-block copoylmers comprising the process of claim 1.

5. A process for preparing 3-block copoylmers comprising the process of claim 1.

6. The process according to claim 1 further comprising adding a termination reagent(3), wherein the homopolymer(s), copolymer(s) or block copolymer(s) is end-functionalized.

7. A process for preparing polymers having bimodal molar mass distributions according to claim 1, further comprising the presence of a second transition metal compound with or without a donor-acceptor interaction.

* * * * *